US006671508B1

United States Patent
Mitsuoka et al.

(10) Patent No.: US 6,671,508 B1
(45) Date of Patent: Dec. 30, 2003

(54) COMMUNICATION CONTROL METHOD, STATUS NOTIFICATION METHOD AND MOBILE COMMUNICATION TERMINAL USING SAME

(75) Inventors: Madoka Mitsuoka, Kawasaki (JP); Hiroyasu Sugano, Kawasaki (JP); Youji Kohda, Kawasaki (JP); Koji Otani, Kawasaki (JP); Naohisa Kawaguchi, Kawasaki (JP); Akinori Iwakawa, Kawasaki (JP); Takashi Ohno, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/475,240

(22) Filed: Dec. 30, 1999

(30) Foreign Application Priority Data

| Mar. 31, 1999 | (JP) | ............................................ | 11-091407 |
| Mar. 31, 1999 | (JP) | ............................................ | 11-091417 |

(51) Int. Cl.⁷ ............................................... H04M 11/10
(52) U.S. Cl. ..................................... 455/412.1; 455/419
(58) Field of Search ................................ 455/412, 414, 455/403, 426, 420, 419, 421, 466, 517; 709/225

(56) References Cited

U.S. PATENT DOCUMENTS 6,081,725 A  *  6/2000  Ishida ......................... 455/421
6,138,158 A  * 10/2000  Boyle et al. ................. 709/225
6,418,311 B1 *  7/2002  Chmaytelli et al. ......... 455/414

FOREIGN PATENT DOCUMENTS

| EP | 0858202 A2 | * 12/1998 | .......... H04M/1/274 |
| JP | 6-30101 | 2/1994 | |
| JP | 7-336761 | 12/1995 | |
| JP | 8-79387 | 3/1996 | |
| JP | 8-168072 | 6/1996 | |
| JP | 9-284379 | 10/1997 | |
| JP | 10-126486 | 5/1998 | |
| JP | 10-173756 | 6/1998 | |
| JP | 10-191458 | 7/1998 | |
| JP | 11-27741 | 1/1999 | |

* cited by examiner

Primary Examiner—Quochien Vuong
(74) Attorney, Agent, or Firm—Staas & Halsey LLP

(57) ABSTRACT

A mobile communication terminal having a phonebook with information corresponding to alternative communication services. The information can be entered remotely from another mobile communication terminal. When a sender selects a recipient and a service from the phonebook, the mobile phone displays the information with the phonebook. The sender selects the most convenient and available communication service for the selected recipient. In an alternative embodiment, a mobile communication network maintains communication statuses of a plurality of mobile communication terminals in a status database. Upon detection of a status change of one of the mobile communication terminals, a notifying portion notifies the other mobile communication terminals of the status change.

45 Claims, 25 Drawing Sheets

Fig. 2A

| NAME | COMMUNICATION SERVICE | COMMUNICATION ADDRESS | AVAILABILITY | PRIORITY | MESSAGE | COMMUNI-CATION ID | ACCESS ID |
|---|---|---|---|---|---|---|---|
| TARO FUJITSU | MOBILE PHONE<br>SHORT MESSAGING<br>PHONE (WORK)<br>ELECTRONIC MAIL | x x x - x x x x - x x x x<br>x x x x - x x x x - x x x x<br>x x x - x x x - x x x x<br>taro@fujitsu.co.jp | AVAILABLE<br>AVAILABLE<br>NOT AVAILABLE<br>AVAILABLE | 1<br>3<br>0<br>2 | EMERGENCY<br>ANYTIME<br>OUT<br>DELAYED CHECKING | ****<br>**<br><br>**** | **<br>**<br><br>****** |
| HANAKO FUJITSU | MOBILE PHONE<br>PHONE (WORK)<br>ELECTRONIC MAIL<br>... | x x x - x x x x - x x x x<br>x x x - x x x - x x x x<br>hanako@fujitsu.co.jp | AVAILABLE<br>AVAILABLE<br>AVAILABLE<br>... | 3<br>1<br>2<br>... | AT NIGHT !<br>ANYTIME<br>EMERGENCY<br>... | ****<br><br>... | **<br>**<br>... |

Fig. 2B

| COMMUNICATION SERVICE | COMMUNICATION ID | ACCESS ID |
|---|---|---|
| MOBILE PHONE<br>SHORT MESSAGING<br>PHONE (WORK)<br>ELECTRONIC MAIL | ****<br>**<br><br>**** | **<br>**<br><br>****** |

Fig. 2C

| PERSON NAME | PERSON ADDRESS |
|---|---|
| TARO FUJITSU<br>HANAKO FUJITSU | x x x - x x x x - x x x x<br>x x x - x x x x - x x x x |
| ... | ... |

Fig. 4

|  | WORK | AWAY | HOME |
|---|---|---|---|
| MOBILE PHONE | NOT AVAILABLE; EMERGNECY ONLY | PRIORITY 1; ANYTIME | PRIORITY 2; EMERGENCY ONLY |
| SHORT MESSAGING | PRIORITY 3; ANYTIME | PRIORITY 2; ANYTIME | PRIORITY 3; ANYTIME |
| PHONE (WORK) | PRIORITY 1; ANYTIME | NOT AVAILABLE; OUT OF OFFICE | NOT AVAILABLE; OUT OF OFFICE |
| PHONE (HOME) | NOT AVAILABLE; CALL AT NIGHT | NOT AVAILABLE; CALL AT NIGHT | PRIORITY 1; ANYTIME |
| E-MAIL | PRIORITY 2; ANYTIME | PRIORITY 3; CAN NOT READ NOW | PRIORITY 4; ANYTIME |

Fig. 6

```
From: TARO FUJITSU (xxx-xxxx-xxxx)
To:   JIRO FUJITSU (xxx-xxxx-xxxx)
<IDENTIFY>
  ID("TARO FUJITSU ","MOBILE PHONE")=********
  ID("TARO FUJITSU ","SHORT MESSAGING")=******
  ID("TARO FUJITSU ","PHONE (WORK)")=****
  ID("TARO FUJITSU ","ELECTRONIC")=*********
</IDENTIFY>
<PHONEBOOK>
SET("TARO FUJITSU ","MOBILE PHONE")=("EMERGENCY ONLY","********",1)
SET("TARO FUJITSU ","SHORT MESSAGING")=("ANYTIME","******",4)
SET("TARO FUJITSU ","PHONE (WORK)")=("OUT OF OFFICE THIS WEEK","****",0)
SET("TARO FUJITSU ","ELECTRONIC")=("UNREADABLE NOW","*********",3)
</PHONEBOOK>
```

PERSON SELECTION WINDOW

→ TARO FUJITSU (MOBILE)
HANAKO FUJITSU (WORK)
SABURO TOKKYO (ELECTRONIC MAIL)
GORO ISHOU (MOBILE)

PROCESS NOTIFICATION WINDOW

TARO FUJITSU (MOBILE)
× × × - × × × × — × × × ×
CONNECTING···

Fig. 10
PERSON SELECTION WINDOW
→ TARO FUJITSU (MOBILE)
HANAKO FUJITSU (WORK)
SABURO TOKKYO (ELECTRONIC MAIL)
GORO ISHOU (MOBILE)
SERVICE SELECTION WINDOW
TARO FUJITSU
→ MOBILE - EMERGENCY ONLY
~~WORK - OUT OF OFFICE THIS WEEK~~
MAIL - UNREADABLE NOW
MESSAGE - ANYTIME
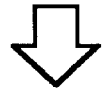
PROCESS NOTIFICATION WINDOW Fig. 11
PERSON SELECTION WINDOW
→ TARO FUJITSU (MOBILE)
HANAKO FUJITSU (WORK)
SABURO TOKKYO
(ELECTRONIC MAIL)
GORO ISHOU (MOBILE)
SERVICE SELECTION WINDOW
TARO FUJITSU
MOBILE - EMERGENCY ONLY
→ WORK - OUT OF OFFICE THIS WEEK
MAIL - UNREADABLE NOW
MESSAGE - ANYTIME
CONFIRMATION WINDOW
○ PHONE (WORK)
CONFIGURATION: NOT
AVAILABLE
COMMUNICATE ? → Y
                 N
PROCESS NOTIFICATION WINDOW Correspondence Table

| Monitor's Table | Monitoree's Address | Condition for Notification |
|---|---|---|
| 090-9999-9999 | 090-1111-1111 | All |
| 090-9999-9999 | 090-8888-8888 | Callable |
| 090-2222-2222 | 090-3333-3333 | All |
| ⋮ | ⋮ | ⋮ |

Fig. 17

License Table

| Monitoree's Address | Monitoror's Address | Condition for Notification | Action |
|---|---|---|---|
| 090-1111-1111 | 090-9999-9999 | Callble | Allow |
| 090-8888-8888 | 090-9999-9999 | Callble | Allow |
| 090-3333-3333 | 090-2222-2222 | All | Reject |
| 090-4444-4444 | 090-9999-9999 | Callable | Allow |
| 090-5555-5555 | 090-9999-9999 | Callable | Allow |
| ⋮ | ⋮ | ⋮ | ⋮ |

Fig. 18

Status Table

| User Name | Communication Address | Status 1 | Status 2 |
|---|---|---|---|
| Taro Fujitsu | 090-1111-1111 | Within Area | Call at Night |
| Hanako Fujitsu | 090-8888-8888 | Line Busy | Anytime |
| Saburo Fujitsu | 090-3333-3333 | Outside Area or Off | |
| ⋮ | ⋮ | ⋮ | ⋮ |

Phonebook

| Name | Phone Number | Registration Status | Status 1 | Status 2 |
|---|---|---|---|---|
| Taro Fujitsu | 090-1111-1111 | ON | Within Area | Call at Night |
| Hanako Fujitsu | 090-8888-8888 | ON | Line Busy | Anytime |
| Jiro Fujitsu | 090-2222-2222 | ON | Turned Off | |
| Saboro Fujitsu | 090-3333-3333 | OFF | | |
| ... | ... | | ... | |

COMMUNICATION CONTROL METHOD, STATUS NOTIFICATION METHOD AND MOBILE COMMUNICATION TERMINAL USING SAME

BACKGROUND OF THE INVENTION

A. Field of the Invention

The present invention relates to technologies that facilitate remote communication via mobile communication terminals such as mobile phone and remote manipulation of information stored in such mobile communication terminals.

B. Definition of Terms

The term mobile communication terminal in the instant application refers to an information terminal that is connected to a mobile communication network and is adapted to send data to and receive data from another mobile communication terminal via the mobile communication network.

Communication services refer to any of a variety of services that utilize various communication means. For instance, such communication services include mobile phone services, telephone services using stationary business related phones, telephone services using home phones, electronic mail services, and/or brief messaging services such as pagers.

C. Description of the Related Art

Many of mobile communication terminals such as cellular telephones, hereinafter referred to as mobile phones, are provided with a phonebook feature whereby names of persons and corresponding telephone numbers may be stored. By storing in advance the names and phone numbers of various people, a user can search for a specific person's phone number and then dial that number speeding up use of the mobile phone. The phonebook can also store multiple phone numbers for a single person, such as home number and work number as well as a mobile phone number.

Communication services available in mobile phones include various services other than voice communication via phones. For instance, such services include text communication services that deliver short text messages (hereinafter short messaging services), electronic mail services that deliver electronic mails via the Internet, and packet communication services such as the "I-mode service" which is available in Japan. Accordingly, there have been offered phonebooks that are compatible with multiple communication services. Japanese Patent Application 10-126486A discloses a phonebook that stores for each person identified in the phonebook, multiple communication services and communication parameters corresponding to communication services.

On the other hand, to utilize the phonebook function of a mobile phone, a user has to input various data manually, which is a burden on the user's part. To alleviate this problem, Japanese Patent Application 6-30101A discloses a communication terminal device which can update its phonebook by receiving phonebook data via the telephone network. Japanese Patent Application 9-284379A and Japanese Patent Application 10-173756A disclose mobile phone terminals which can send and receive phonebook data to and from one another.

PROBLEM TO BE SOLVED BY THE INVENTION

In communication based on mobile phones that can accommodate multiple communication services, it is sometimes the case that a person can be contacted by a certain communication service but not by other communication services, depending on the person's situation. Also, a user may want other people to contact him by a communication service that suits the user's situation. For instance, a user may want other people to call his mobile phone while he is away. But, he wants other people to leave a message by a short messaging service while he is driving a car or while he is in a theater. Also, a user may want other people to call him at his current location. For instance, he wants to be called primarily at work while he is at work, at home while he is home, and at a mobile phone while he is traveling.

However, conventional phonebooks merely administer communication parameters that are necessary for conducting communications, such as by updating people and their phone numbers and adding communication services. Consequently, a user cannot tell which of the communication services is available for a particular person. Also, a user cannot determine which of the communication services is most desirable for a particular person.

In the aforementioned communication terminals disclosed in Japanese Patent Application 6-30101A, Japanese Patent Application 9-284379A, and Japanese Patent Application 10-173756A, contents of phonebooks can be updated by accessing the phonebooks remotely. In this case, it is preferable that information regarding a certain person can be updated only by that person. However, currently there are no phonebook that have access control function for updating contents.

In view of the above, there exists a need for an improved mobile communication terminal which overcomes the above mentioned problems in the prior art. This invention addresses this need in the prior art as well as other needs, which will become apparent to those skilled in the art from this disclosure.

The term mobile communication system in the instant application refers to a telecommunication network that relays signals and communications to and from the mobile communication terminals. Such mobile communication systems normally includes several base stations, a mobile communication switcher, and an administration device. The mobile communication terminals connect to at least one of the base stations via microwave or other radio-type frequency transmission. Each base station is connected to the mobile communication switcher. The administration device stores communication statuses of the mobile communication terminals in a status DB.

There has been a rapid increase in installment of mobile communication systems that provide communication services to a plurality of mobile phones and PHS (Personal Handyphone System), hereinafter referred to as mobile terminals. The mobile communication system recognizes multiple areas, and supports communication among mobile terminals within each area. Communication status of each mobile terminal is administered by the administration device. The mobile terminals are each adapted to connect to a nearby base station. Once a mobile terminal moves to a different area, the mobile terminal is usually able to connect to another nearby base station in the different area. When the mobile terminal connects to a different base station, the administration device is aware of such a change.

Due to rapid increase in the use of the aforementioned mobile communication system, a user can call anyone he wishes to call anytime from almost anywhere. On the other hand, a caller cannot tell whether a callee is in a situation in which he can receive a call. Consequently, a callee has to receive a call regardless of what situation he is in. To resolve this problem, a user can turn off his mobile terminal when he does not want to receive a call. However, once a user turns off his mobile terminal, he cannot receive an emergency call or a call from someone important. Also, when a caller finds out that his callee mobile terminal is turned off, the caller cannot determine when the callee will be able to receive a call.

Japanese Patent Application 10-191458A discloses a mobile phone system in which a caller is notified that his callee is now callable, if his callee's communication status has been "Line Busy" or "Out of Area" or "Turned Off". Japanese Patent Application 11-27741A, Japanese Patent Application 8-168072A, Japanese Patent Application 8-79387A, and Japanese Patent Application 7-336761A also disclose technologies for mobile communication system, which notify a caller that his callee recovered from the unavailable status, and even connect lines under certain circumstances.

MORE PROBLEM TO BE SOLVED BY THE INVENTION

In the mobile phone system disclosed in Japanese Patent Application 10-191458A, it is a base station of the mobile phone system that has functions of detecting the communication status of the callee and notifying the caller of the status. In this case, all the base stations of the mobile phone system in operation have to be provided with the aforementioned functions, which is difficult to achieve. Also, since the base station sends a signal to the callee at predetermined periods of time, the base station has to generate a large amount of signals that are of no use. In other words, the aforementioned mobile phone system is simply a mobile communication system that has so-called camp-on service, in which the caller ask the callee to return his call when the callee regains an available status. Similarly, technologies disclosed in Japanese Patent Application 11-27741A, Japanese Patent Application 8-168072A, Japanese Patent Application 8-79387A, and Japanese Patent Application 7-336761A are also camp-on services applied to mobile communication.

As mobile terminals have become indispensable as a means of communication both in business and people's daily life, there has been a new need to conduct communication while taking into consideration callee's status and privacy. For instance, a caller would want to observe etiquette by abstaining from calling when the callee is busy, unless the caller has an important reason to call. Similarly, a user would want to be able to conduct communication that suits his needs, such as receiving only emergency calls while he is busy. Nonetheless, there has been no mobile communication system that allows a user to conduct communication while taking into consideration the callee's status and privacy.

In view of the above, there exists a need for an improved mobile communication system that takes into consideration user's status and desire for privacy and notifying corresponding information to appropriate users, thereby overcoming the above mentioned problems in the prior art. This invention addresses this need in the prior art as well as other needs, which will become apparent to those skilled in the art from this disclosure.

SUMMARY OF THE INVENTION

One object of the present invention is to provide a means for a mobile communication terminal to communicate in a way that suits the situation of the person being contacted.

Another object of the present invention is to provide a mobile communication terminal that controls access to user information inside a mobile communication terminal.

In accordance with one aspect of the present invention, there is a communication control method for use in a mobile communication terminal where the mobile communication terminal has a phonebook that correlates persons, communication services, and communication addresses. The mobile communication terminal is adapted to send and receive phonebook data remotely. The communication control method including steps of:

A; receiving predetermined additional information remotely, the additional information relating to a status of a communication service of a person registered in the phonebook;

B; storing the received additional information, such that the additional information, the communication service, and the person registered in the phonebook correlate with one another; and C; outputting based on the stored additional information a status of the communication service for the person registered in the phonebook.

A mobile communication terminal is, for instance, a mobile phone. Additional information is changed in the phonebook of the mobile phone remotely. The additional information includes, "Available/Not Available", text messages such as "Anytime" and "Call at night", and "Priority", where "Priority" designates the preferred mode of communication.

The mobile phone that has a phonebook with the additional information stored therein displays statuses of communication services of the person being called, while, for instance, the mobile phone displays the phonebook. The mobile phone displays the statuses by, for instance, crossing out "unavailable" services, displaying the communication services in order of priority, or displaying text messages that correspond to the communication services. In this manner, a user can select a communication service that suits the person most, even if the person's situation changes dynamically. As a result, the person can conduct smooth communication with other persons.

Another aspect of the present invention is to provide a mobile communication terminal having a phonebook correlating persons, communication services, and communication addresses. The mobile communication terminal is adapted to send and receive phonebook data remotely. The mobile communication terminal including an additional information table, administration means, and output control means. The additional information table is adapted to store predetermined additional information such that the additional information, communication services, and persons correlate with one another. The additional information indicates a status of a communication service for a person registered in the phonebook. The administration means receives the additional information remotely and writes the additional information in the additional information table. The output control means outputs the status of the communication service for the person registered in the phonebook based on the additional information.

The additional information is stored in the additional information table such that the additional information correlates with the communication service that is available to the person. The additional information table can also be formed as a part of the phonebook. The administration means receives additional information from another mobile phone and/or a base station to which mobile phones are connected. Then the administration means writes the additional information in the additional information table. The output control means reports to the user the statuses of the communication services for the person by, for instance, displaying the statuses. For instance, the output control means displays whether or not the communication service is available, which communication service is convenient, and/or text messages regarding the communication services. The output control means can also report the statuses in sound.

Preferably, in the mobile communication terminal, the additional information includes a distinction flag that indicates whether or not the communication service is available to the person. Also, the output control means outputs based on the flag whether the communication service is available to the person.

The output control means displays which of the person's communication services are available, and which of them are not available. In this manner, a user can select a communication service that is suitable to the person, based on whether or not the communication service is available to the person.

Preferably, in the mobile communication terminal, the additional information includes a prioritization of the preferred communication services designated by the person listed. Also, the output control means outputs the communication services in the prioritized order. The output control means displays along with the phonebook, communication services that each person designate as the first priority, for example. The output control means can also let the user select a person, and thereafter display, in order of priority, communication services designated by the person listed.

Preferably, in the mobile communication terminal, the additional information includes visual information indicating that the listed person has designated something with respect to communication service. Also, the output control means displays persons, communication services, and visual information such that persons, communication services, and visual information are correlated with one another.

Examples of visual information include text messages and icons. For instance, the output control means can display text messages such as "Call at night" or "Emergency only", along with communication services of a person. In this manner, the user can know the person's situation regarding the communication services.

Preferably, the mobile communication terminal further includes a communication certification table and reporting means. The communication certification table is adapted to store certification information such that the certification information, persons, and communication services correlate with one another. The certification information is utilized in requesting communication by the communication service to a person listed in the phonebook. The reporting means reports to the person the certification information that corresponds to the communication service, in requesting communication by the communication service.

For instance, in the case of communication by a short messaging service, the reporting means hides certification information at a predetermined position within a message. The certification information relates to the short messaging service of the person to whom the message is to be sent. The person's mobile phone extracts the hidden certification information, and compares the extracted certification information with, for instance, the certification information that the administration means stores. Certification through a similar process can take place in other communication services. For instance, the mobile phone can reject a communication request from a person who does not have certification information. In this way, the mobile phone can selectively accept communication requests.

Preferably, the mobile communication terminal further includes certification means. The certification means stores certification information that is utilized in determining whether or not a request for communication by another mobile communication terminal should be granted. The certification means also determines whether or not communication should be allowed based on the certification information sent by the mobile communication terminal.

The certification means executes certification process that occurs in a mobile phone that received above-described certification information. More specifically, the certification means executes processes such as rejecting a communication from another mobile phone when the certification information do not match.

Preferably, the mobile communication terminal further includes an access information table. The access information table is adapted to store access information such that the access information correlates with persons and communication services. The access information is adapted to be utilized for deciding whether or not update of additional information should be allowed. In the mobile communication terminal, the administration means receives the additional information and the access information remotely, compares the received access information and the stored access information, and updates said additional information table with the received additional information based on the results of the comparison.

When a mobile phone receives new additional information and access information, the administration means compares the received access information and the stored access information. The administration means updates the additional information only when two access information match. In this manner, an unwelcome user is prevented from updating additional information.

Preferably, the mobile communication terminal further includes data entry means for accepting input of additional information and identification of a person. The additional information corresponds to a communication service, and the additional information is to be transmitted to the identified person. The data entry means also transmits the configured additional information to the identified person.

Since a mobile communication terminal has data entry means, the mobile communication terminal can receive and store additional information, and transmit the additional information to identified persons.

Preferably, the mobile communication terminal further includes a status table. The status table stores predetermined statuses and predetermined additional information regarding a communication service such that the statuses correlate with the additional information. In the mobile communication terminal, the data entry means accepts selection of the predetermined statuses and configures additional information for the communication service based on the selected status.

Examples of status in the status table include "Work", "Away", and "Home". Once a status is selected, additional information for each communication service is entered and the status table configured accordingly. For instance, once "Work" is selected, mobile phone service and home phone service become "not available", whereas work phone services is given the highest priority. By having sets of additional information for predetermined different situations in advance, the user has less burden of configuring additional information.

Preferably, in the mobile communication terminal, the data entry means further includes a person list that includes persons' addresses to which additional information should be sent, and write a person's address in the person list when the phonebook data has been sent remotely.

When a user sends information regarding his mobile phone to another mobile phone, the data entry means adds in the person list the mobile phone to which the information is sent. In this way, the user does not have to make data entries for the person to whom additional information is sent.

Still another aspect of the present invention is to provide a computer-readable recording medium having communication control program therein. The communication control program is for use in a mobile communication terminal that stores a phonebook and is adapted to send and receive phonebook data remotely. The phonebook correlates persons, communication services, and communication addresses. The communication control program is adapted to execute steps of:

A; receiving predetermined additional information remotely, the additional information relating to a status of a communication service of a person registered in the phonebook;

B; storing the received additional information, such that the additional information correlate with the communication service and the person registered in the phonebook; and C; outputting based on the stored additional information a status of the communication service for the person registered in the phonebook.

Preferably, the computer-readable recording medium has similar effects as the above-described mobile communication terminal. Examples of recording media include computer readable/writeable disks, hard disk drives, semiconductor memory, CD-ROM, DVD and MO.

Another aspect of the present invention is to provide a status notification method for use in a mobile communication system having mobile communication terminals and a mobile communication network. The mobile communication terminal is connected to the mobile communication network. The mobile communication network administers communication statuses of the mobile communication terminals. The status notification method includes steps of:

A: determining a change in the communication status of a mobile communication terminal;

B: transmitting the change in communication status to other mobile communication terminals via the mobile communication network and store corresponding information in the other mobile communication terminals; and C: outputting the stored communication status of other communication terminals.

By reporting the communication status of a mobile communication terminal administered by the mobile communication system to mobile communication terminals, a user can be notified of his callee's status at any desired time. For instance, by configuring a mobile communication terminal such that it displays communication statuses when it displays a phonebook, a user can learn his callee's status by displaying the phonebook.

Another aspect of the present invention is to provide a status notification system for use in a mobile communication system. The mobile communication system has mobile communication terminals and a mobile communication network. The mobile communication terminals are connected to the mobile communication network. The mobile communication network administers communication statuses of the mobile communication terminals. The status notification system includes detecting means and sending means. The detecting means detects a change in the communication status of a mobile communication terminal and retrieves the identification of the mobile communication terminal and the new communication status from the mobile communication network. Upon the detection of the change, the sending means sends the identification of the mobile communication terminal and the new communication status to other mobile communication terminals via the mobile communication network. The mobile communication terminals has storing means and status outputting means. The storing means stores the identification of the mobile communication terminal and the corresponding communication status. The status outputting means outputs the stored communication status of other communication terminals.

The detecting means detects a change in a database which stores communication statuses of mobile communication terminals (hereinafter referred to as mobile terminals). Once a change occurs, the detecting means retrieves the name of the mobile terminal and the new communication terminal from the database. The sending means transmits the retrieved name of the mobile terminal and the communication terminal to other mobile terminals. If the storing means of a mobile terminal stores a phonebook that correlates user names and phone numbers, the storing means also stores communication statuses in the phonebook. If the user can operate the mobile phone such that the phonebook is outputted in the display, the status outputting means displays communication statuses such as "Line Busy", "Out of Area", and "Available", along with the user names and phone numbers. In this manner, the user can learn other users' communication statuses at any desired time by displaying the phonebook. Also, the mobile terminal can be configured so as to display a communication status whenever the mobile terminal receives one.

Preferably, in the status notification system, the detecting means further includes a monitoring table and detects a change in the communication status of a mobile communication terminal according to the monitoring table. The monitoring table has registered therein identification of the mobile communication terminals whose change in the communication status is to be detected (hereinafter referred to as monitored terminals).

The monitoring table has registered therein monitored terminals, whose change in communication status is monitored. The detecting means monitors a change in the database. In response to changes in the communication status in the monitored terminal, the detecting means sends identification of the mobile terminal and the new communication status to the sending means. In this manner, an increase in the amount of communication traffic between the detecting means and the sending means is prevented.

Preferably, in the status notification system, the sending means further includes a correspondence table, and determines receivers of the new communication status based on information in the correspondence table. The correspondence table stores identification of the monitored terminals and identification of mobile communication terminals which receive the communication statuses of the monitored terminals (hereinafter referred to as monitoring terminals), such that specific monitored terminals are identified with the monitoring terminals that are to receive information relating to status changes of the specific monitored terminals. The sending means determines which monitoring terminal should receive new communication status information concerning a specific monitored terminal based on the information in the correspondence table.

Preferably, in the status notification system, the correspondence table stores conditions for sending the communication status as well as identification of the monitored terminals and monitoring terminals and correspondence therebetween. The sending means determines based on the correspondence table which monitoring terminal should receive communication status.

Examples of conditions that must be present for sending the communication status include "When the mobile terminal becomes available to receive calls" and "whenever the communication status has changed". For instance, the communication status of a monitored terminal may become "Out of Area", whereas the condition for sending the communication status according to the correspondence table is "When the mobile terminal becomes available to receive calls". In this case, the sending means determines that the communication status does not need to be sent out, and does not send out the communication status. If the communication status of the monitored terminal became "Within Area", with the sending condition being the same as above, then the sending means determines that the communication status "Within Area" should be sent out.

Preferably, in the status notification system, the sending means receives from a mobile communication terminal a predetermined send request that specifies a monitored terminal, and registers and updates the correspondence table based on the send request. The mobile communication terminals include configuring means for creating a send request and transmitting the send request to the sending means.

The configuring means of the mobile terminal includes a selection screen that allows the user to select one or more mobile terminals and designate conditions for sending the communication status, as displayed on the selection screen. The selected mobile terminal and conditions are sent to the sending means, whereby the sending means registers them in the correspondence table. In this manner, the user requests the communication status of a desired user.

Preferably, in the status notification system, if the sending means updates the correspondence table according to a send request from a mobile communication terminal, the sending means sends to the detecting means predetermined information based on updated contents. The detecting means further includes a monitoring table, detects a change in the communication status of a mobile communication terminal according to the monitoring table, and updates the monitoring table according to the predetermined information sent from the sending means. The monitoring table has registered therein identification of the monitored terminals.

The sending means reports the identity of the monitored terminal and the conditions that it receives from the mobile terminal to the detecting means. The detecting means stores the reported name of the monitored terminal and the condition in the monitoring table. In this manner, registration and updating of the monitoring table is simple and easy. It also minimizes the amount of communication traffic between the detecting means and the sending means.

Preferably, in the status notification system, the sending means includes a license table provides a correlation between the monitoring terminals, the monitored terminals, and availability flags. The availability flag indicates whether the communication status of a specific monitored terminal can be transmitted to a specified monitoring terminal. The sending means updates the correspondence table according to the license table when it received a send request transmitted from a mobile communication terminal.

For instance, the license table may have registered therein monitoring terminal W, monitored terminal S, and availability flag "Off". If the monitoring terminal W sends a send request that designates the mobile terminal S as a monitored terminal, the sending means does not register the send request in the correspondence table because the availability flag is the license table is "Off".

Preferably, in the status notification system, the sending means receives from a mobile communication terminal a license registration request that specifies a monitored terminal and an availability flag, and updates the license table according to the license registration request. The mobile communication terminals further include license configuring means for accepting configuration of a license registration request and sending the configuration to the sending means.

For instance, the license configuration means displays a selection screen where a monitored terminal, a condition for notification, and the availability can be selected. The selections are included in the license registration request, and sent to the sending means. In this manner, the user can select users to whom he wishes to report his own status. Therefore, the user can protect his privacy.

Preferably, in the status notification system, the sending means further includes a status table for storing the identification of the mobile communication terminals and corresponding user statuses. The user statuses are separate from the communication statuses. The sending means receives a user status from a mobile communication terminal and writes the user status in the status table. When a change occurs in a user status, the sending means is adapted to send the user status and the identification of the corresponding mobile communication terminal to other mobile communication terminals. The mobile communication terminals further include user status configuring means for accepting configuration of the user status and transmitting the configuration to the sending means.

For instance, the user status configuration means accepts selection of user statuses such as "Emergency Only", "Call at Night", and "Anytime". The selected user status is sent to the sending means along with the address of the mobile terminal. The sending means stores the received information in the status table. The sending means also monitors a change in the user status. If a change occurs, the sending means sends the new user status to other mobile terminals. The sending means sends the new user status to other mobile terminals according to the information in the correspondence table. Also, the sending conditions in the correspondence table may include "When the user status changed".

Still another object of the present invention is to provide a monitoring device for use with a mobile communication network to which mobile communication terminals are connected. The mobile communication network administers communication statuses of the mobile communication terminals. When a mobile communication terminal changes its communication status, the monitoring device is adapted to retrieve a new communication status of the mobile communication terminal, and send the identification of the mobile communication terminal and the new communication status to other mobile communication terminals.

More specifically, the monitoring device detects a change in a status DB. The status DB is usually installed in the mobile communication network. Once a change in the status DB is detected, the monitoring device retrieves from the status DB the new communication status and the name of the mobile terminal to which the change occurred. Then the monitoring device sends the identification of the mobile terminal and the new communication status to other information process devices such as the aforementioned sending means. The information process device can connect to the mobile communication network either directly or indirectly, thereby receiving information sent from the monitoring device.

Still another aspect of the present invention is to provide a sending device for use with a mobile communication network to which mobile communication terminals are connected. The mobile communication network is adapted to detect a change in the communication status of a mobile communication terminal, and send out the new communication status. The sending device is adapted to send the identification of the mobile communication terminal and the new communication status to other mobile communication terminals via the mobile communication network. The identification mobile communication terminal and the new communication status have been sent from the mobile communication network.

The sending device is connected to the mobile communication network that includes the detecting device. The sending device can be connected directly to the mobile communication network, or indirectly via a gateway device that connects the mobile communication network and the computer network. The sending device only needs to be able to 1) receive and 2) send to the mobile communication terminals the identification of the mobile terminal and the new communication status of the mobile terminal, which are sent from the detection device of the mobile communication network.

Still another aspect of the present invention is to provide a mobile communication terminal for use on a mobile communication network. The mobile communication network stores identification information for identifying other mobile communication terminals, and is adapted to display the stored identification information. The mobile communication terminal includes storing means and display means. The storing means receives the communication statuses of other mobile communication terminals from the mobile communication network, and stores the communication statuses so as to correspond with the identification information. The display means displays the identification information and the corresponding stored communication status.

The mobile communication terminal preferably has the same effect as the above-described mobile communication terminal. Communication address is generally utilized as identification information of the mobile communication terminal. The mobile communication terminal may store and display information additional to the identification information, not only the identification information. Examples of such additional information includes user's name.

Still another aspect of the present invention is to provide a mobile communication terminal for use on a mobile communication network. The mobile communication network stores a phonebook that correlates persons and communication addresses. The mobile communication network is adapted to display the phonebook according to configuration. The mobile communication terminal includes storing means and display means. The storing means receives the communication status of a person from the mobile communication network, and stores the communication status so as to correspond with the person. The display means displays the stored communication status along with the phonebook when the phone is displayed.

The mobile communication terminal preferably has the same effect as the above-described mobile communication terminal.

Still another aspect of the present invention is to provide a computer-readable recording medium having a send program stored therein. The send program is for use in an information terminal that is adapted to connect with a mobile communication network to which mobile communication terminals are connected. The mobile communication network is adapted to detect a change in communication statuses of the mobile communication terminals and send out a new communication status. The send program is adapted to execute steps of:

A; receiving the identification of the mobile communication terminal and the new communication status sent from the mobile communication network; and B; sending the identification of the mobile communication terminal and the new communication status to other mobile communication terminals via the mobile communication network.

The mobile communication terminal preferably has the same effect as the above-described sending device.

Still another aspect of the present invention is to provide a computer-readable recording medium having a display control program stored therein. The display control program is for use in a mobile communication terminal on a mobile communication network. The mobile communication network stores a phonebook that correlates persons and communication addresses. The mobile communication network is adapted to display the phonebook according to a predetermined configuration. The display control program being adapted to execute steps of:

A; receiving the communication status of a person from the mobile communication network and storing the communication status so as to correspond with the person; and B; displaying the stored communication statuses along with the phonebook when the phonebook is displayed.

Examples of recording media include computer readable/writeable disks, hard disk drives, semi-conductor memory, CD-ROM, DVD and MO.

The mobile communication terminal preferably has the same effect as the above-described mobile communication terminal.

Still another aspect of the present invention is to provide a status notification system, which includes a computer network, a mobile communication network, a gateway device, status storing means, and sending means. The computer network has information terminals connected thereto. The computer network is adapted to detect a user status. The mobile communication terminals are connected to the mobile communication network. The gateway device is adapted to connect the computer network and the mobile communication network. The status storing means stores identification of users along with corresponding user statuses on the computer network and corresponding user statuses on the mobile communication network. The user statuses on the mobile communication network include communication statuses of the mobile communication terminals. The sending means detects a change in user statuses stored in the status storing means, and sends the identification of the user and the new user status to the mobile communication terminals. The mobile communication terminals have storing means and status outputting means. The storing means stores the user status and the identification of the user that it received, such that they correspond to one another. The status outputting means outputs the stored user status according to configuration.

The information terminal is adapted to detect user status based on activation status of screen saver, frequency of input in an application, user's schedule, and user's position as detected by infrared. The status storing means stores the user statuses on the mobile communication network and corresponding detected user statuses on the computer network. Once any of the user statuses changes, the sending means sends the new user status to mobile terminals of other users. For instance, user A's mobile terminal will be notified if user B's status changes to "In Meeting". User A knows that user B is in meeting before he calls user B, therefore user A can observe appropriate etiquette by not calling user B while he is in meeting.

These and other objects, features, aspects and advantages of the present invention will become more fully apparent from the following detailed description of the present invention when taken in conjunction with the accompanying drawings where like reference numerals denote corresponding parts throughout.

BRIEF DESCRIPTION OF THE DRAWINGS

Referring now to the accompanying drawings which form a part of this original disclosure:

FIGS. 2A, 2B and 2C are an explanatory conceptual views showing examples of information stored in memory portion for use in the mobile phone in accordance with the present invention, specifically: FIG. 2A an explanatory view showing an example set of entries in a phonebook including additional information and access IDS; FIG. 2B is an explanatory view showing an example of a certification information table; and FIG. 2C is an explanatory view showing an example of a person list;

FIG. 4 is an explanatory view showing an example of a status table for use in mobile phone in accordance with the present invention;

FIG. 6 is an explanatory view showing an example of a registration message for use in mobile phone in accordance with the present invention;

FIG. 10 is an explanatory view showing another example of a screen displaying additional information in accordance with the present invention;

FIG. 11 is an explanatory view showing still another example of a screen displaying additional information in accordance with the present invention;

FIG. 17 is a conceptual explanatory view of a license table used in the status notification system in accordance with the present invention;

FIG. 18 is a conceptual explanatory view of a status table used in the status notification system in accordance with the present invention;

DETAILED DESCRIPTION OF THE INVENTION

FIRST EMBODIMENT

A mobile communication terminal in accordance with a first embodiment of the present invention is described below with reference to FIGS. 1–13. The following description is directed to a plurality of mobile phones 2, however only one mobile phone 2 (a mobile communication terminal) is described below. The term "user" refers to an individual using the mobile phone 2. The term "Persons" refers to other people to whom the "user" makes calls to, sends data, and from whom the user receives calls and data.

Structure

Figure 1:
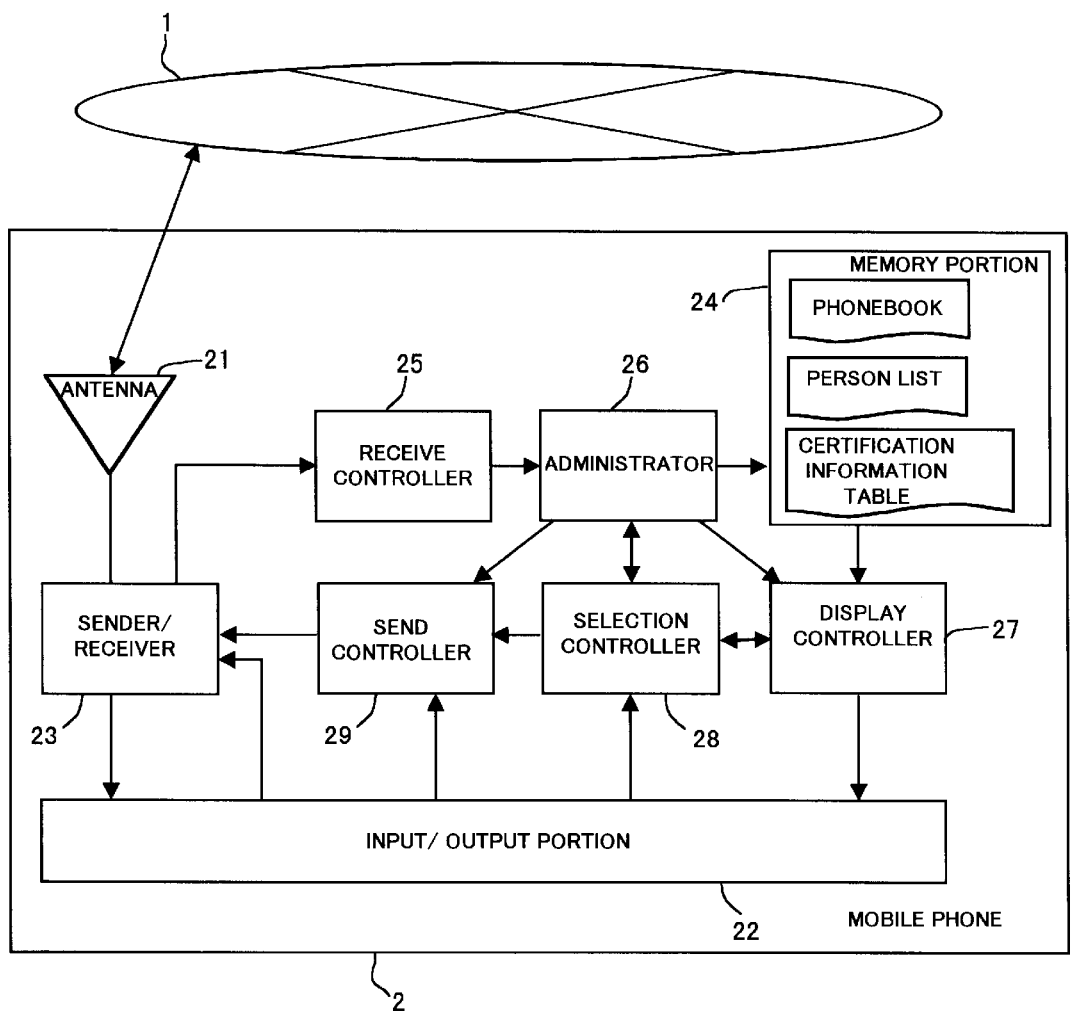
FIG. 1 is a functional block view of a mobile phone in accordance with a first embodiment of the present invention.

FIG. 1 is a block chart showing functional structure of a mobile phone 2 in accordance with the first embodiment of the present invention. The mobile phone 2 in FIG. 1 includes an antenna 21, an input/output portion 22, a sender/receiver 23, a memory portion 24, a receive controller 25, an administrator 26, a display controller 27, a selection controller 28, and a send controller 29. The mobile phone 2 is adapted to send data to and receive data from another mobile phones via a mobile communication network 1. The mobile phone has a phonebook stored in the memory portion 24. The mobile phone 2 can display the phonebook upon a command to do so.

The antenna 21 is adopted to make contact and communicate with a base station that forms a part of the mobile communication network 1. The antenna 21 sends and receives a wireless signal to and from another mobile phone via the base station and the network 1. The base station is included in the mobile communication network 1 to send and receive wireless signal to and from other mobile phones that are in range of other base stations in the network 1.

The input/output portion 22 includes, a speaker, a microphone, number keys, operation key or keys, and a display, among other items. The operation key(s) is, for instance, a selection button and/or a send button.

The sender/receiver 23 encodes and decodes wireless signals that the antenna 21 sends and/or receives. More specifically, the sender/receiver 23 encodes un-encoded voice signal inputted from the input/output portion 22. The sender/receiver 23 then sends the encoded voice signal to the antenna 21. When receiving a wireless signal, the sender/receiver 23 sends decoded voice signals to the speaker of the input/output portion 22. When the input/output portion 22 receives data other than voice data, the sender/receiver 23 sends the data to the receive controller 25. Examples of data sent to the receive controller 25 include data other than voice data, such as text data and visual data (described in greater detail below).

The memory portion 24 stores the data extracted and received by the receive controller 25, such as text messages. The memory portion 24 also stores the phonebook mentioned above, as shown in FIG. 2A. The phonebook includes predetermined additional information as well as communication parameters. The phonebook has the additional information, as is explained in more detail below.

The memory portion 24 also stores a certification information table as shown in FIG. 2B. The certification information table includes correlated information such as communication services, communication IDs, and access IDs. The communication ID is certification information utilized when the mobile phone receives a communication request from various communication services to determine whether or not a communication request should be granted. The access ID is certification information utilized to update additional information that corresponds to various communication services.

The memory portion 24 also stores a person list shown in FIG. 2C. The person list correlates names and notification addresses of the persons who should be notified of additional information. In this embodiment, since mobile phones send and receive data to and from one another, the notification addresses are mobile phone numbers.

The receive controller 25 executes an automatic receiving process for data such as text messages. For instance, the receive controller 25 extracts text message body and phonebook data from the data that it receives from the sender/receiver 23. The receive controller 25 then stores the extracted data in the memory portion 24. The receive controller 25 also extracts additional information from received data, and then sends the extracted additional information to the administrator 26 as is explained further below.

The administrator 26 stores in the memory portion 24 text messages and additional information that the receive controller 25 extracts. The administrator 26 also generates upon a command to do so a registration message that is in a predetermined format having additional information and a certification ID (referred to below as certification information). The administrator 26 then sends the registration message to the send controller 29.

The display controller 27 retrieves phonebook data from the memory portion 24, and displays the data on the display of the input/output portion 22. The display controller 27 retrieves the person list and a predetermined window from the memory portion 24, and displays them on the display of the input/output portion 22.

The selection controller 28 is configured to process entry of data made by a user using the displayed window displayed on the display of the input/output portion 22, such as an input to select a person or a communication service. The selection controller 28 also accepts input of text messages from the operation keys. The selection controller 28 sends such inputted information to the administrator 26.

The send controller 29 controls transmission of wireless signals. More specifically, the send controller 29 converts the data received from the administrator 26 such that the data are compatible with the selected communication service. The send controller 29 then sends the data to the sender/receiver 23.

Phonebook

FIG. 2A is a conceptual explanatory view of a phonebook stored in the memory portion 24. In the first embodiment, the phonebook stores communication parameters, predetermined additional information, and predetermined certification information. The communication parameters include names of the person called, types of the communication services used by each person, and the communication address for each person. The communication parameters are similar to those in regular phonebooks, and therefore will not be explained here. The additional information includes availability, priority, and message (remarks). The certification information includes communication IDs and access IDs.

"Availability" of the additional information indicates for each communication service whether or not the communication service is available to the person being called. "Priority" is the sequence of priority that each person has given to the communication services. "Message" is a text message that indicates status of each person with respect to the communication services.

Among the certification information, "Communication ID" is a certification information that corresponds to a particular communication service and is required for communication with the person using the corresponding communication service. "Communication ID" is usually registered for each communication service, because different communication services sometimes require different types of certification information. Usually, communication IDs are not explicitly displayed while the phonebook is displayed. "Access ID" is certification information required to update additional information or communication IDs of a person as is explained further below. Usually, access IDs are not explicitly displayed while the phonebook is displayed. The certification information can also include predetermined passwords and public keys under public key system together with the access IDs, as can the communication IDs, described above. In the first embodiment, the access IDs are sent out and received together with the communication parameters, and stored in the phonebook.

Registration of Configuration for Additional Information (1) Registration of Additional Information Processes of configuring additional information and reporting the additional information to another mobile phone is now explained.

Figure 3:
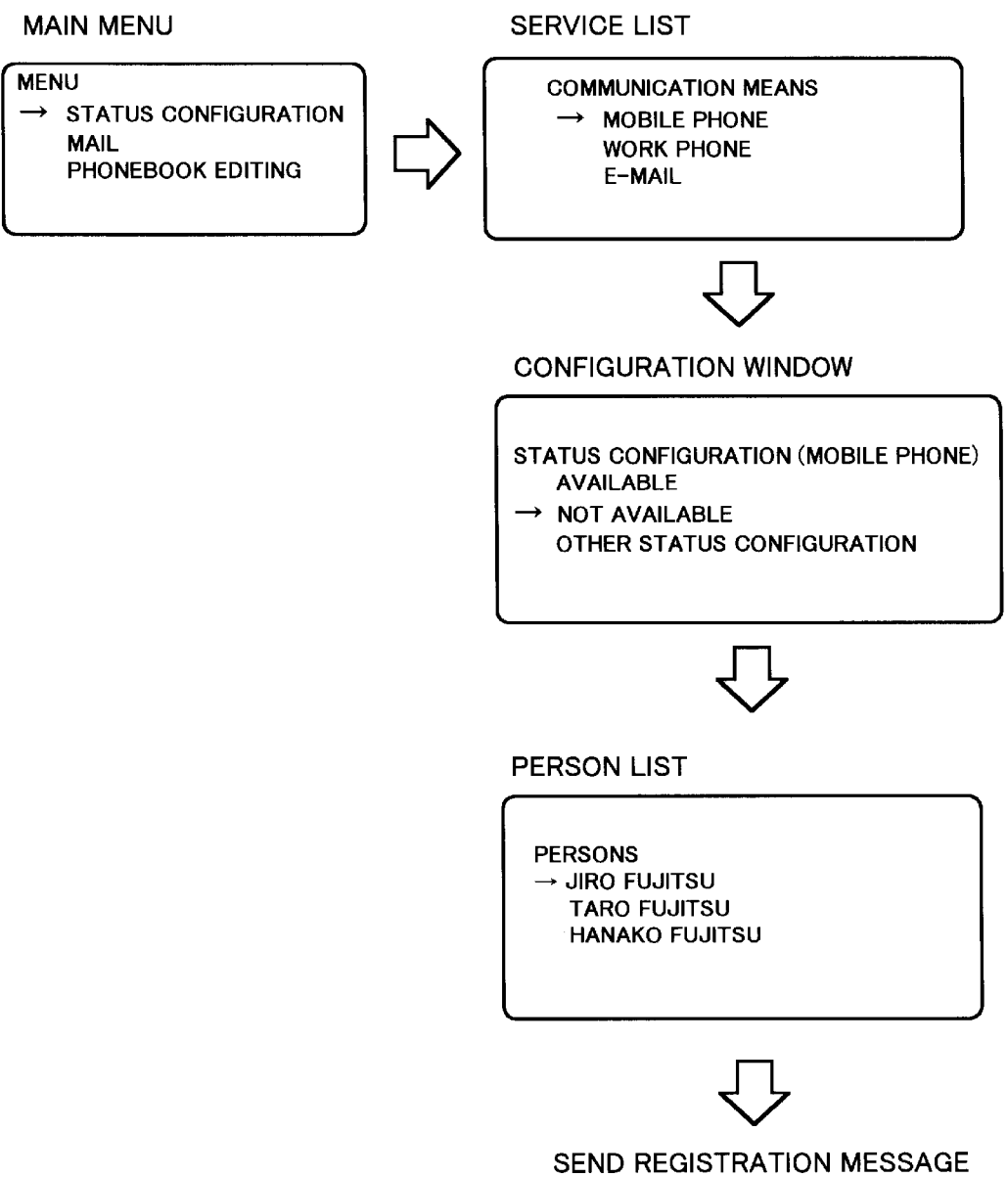
FIG. 3 is an explanatory view showing an example of a screen where additional information is configured.

FIG. 3 is an explanatory view that shows an example of configuration screen for additional information. FIG. 3 is a "Main Menu" screen, where a user makes a selection of process. In this embodiment, the "Main Menu" screen displays "Status Configuration" apart from the process menus that are included in conventional main menu. When "Status Configuration" is selected, a "Service List" is displayed. "Service List" displays a list of communication services that are available to the user's mobile phone. Once one of the communication services is selected, "Configuration Window" screen is displayed. FIG. 3 shows an example where a mobile phone service is selected as a communication service.

The "Configuration Window" screen displays choices of the additional information to be registered or selected in the phonebook. The "Configuration Window" in FIG. 3 shows an example where availability is selected. Other additional information can also be configured in a similar manner. Once the user finishes selecting all the additional information, "Person List" shown in FIG. 3 will be displayed. Once the user selects a person from the list and pushes the send button, a registration message that describes the configured status will be sent to the selected person. It is also possible to configure or select such that the registration message is sent to all the persons listed in the Person List, or, alternatively, the user may selects persons from the Person List to whom the registration message should not be sent and all other persons receive the registration message. The registration message includes communication ID and access ID (that correspond to the communication service being configured) retrieved from the certification information table.

Although each item of the additional information is independently configured or selected, as shown in FIG. 3, a user can also utilize a status table to make operation of configuration and selection easier. FIG. 4 is an explanatory view that shows an example of the status table. The status table stores predetermined statuses and predetermined values of additional information such that the statuses and the values of additional information correlate with one another. By utilizing the status table, a user can create a registration message that includes values of corresponding additional information by simply selecting one of the statuses. In the example shown in FIG. 4, if a user selects "Away", the additional information for the mobile phone service is configured as "Available", "Priority 1", whereas if "Home" is selected the mobile phone service is "Priority 2", "Emergency only". The additional information for other communication services can also be configured from the status table in a similar manner.

Figure 5:
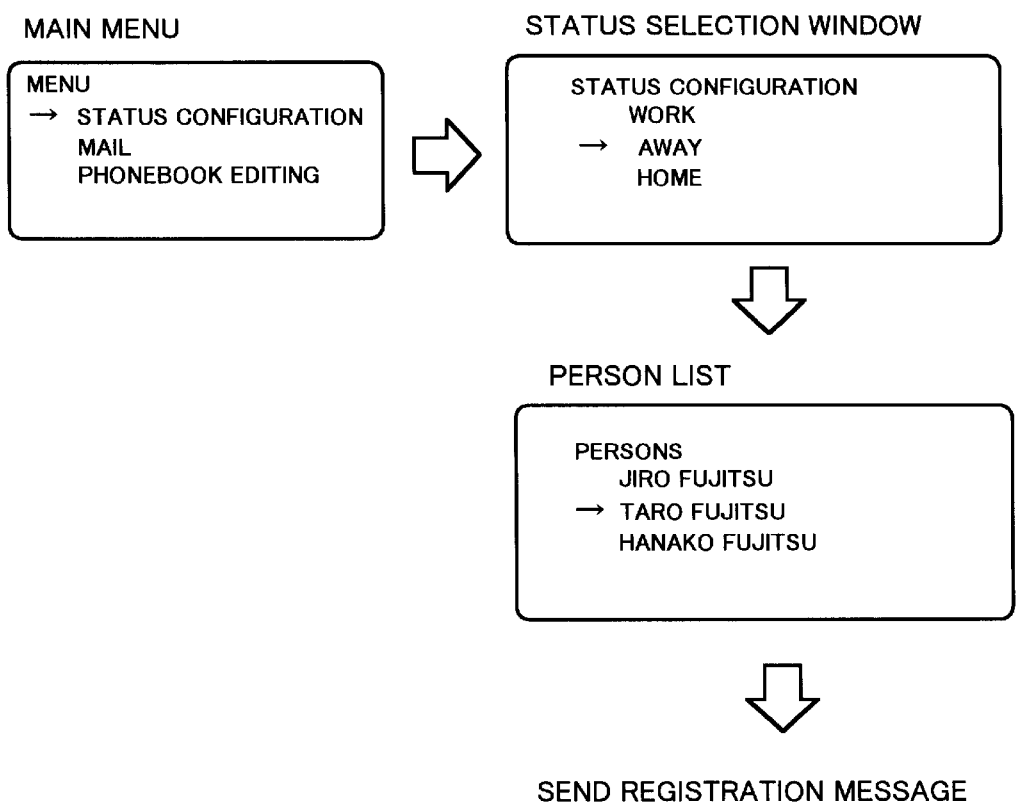
FIG. 5 is an explanatory view showing an example of configuration screen for additional information when the status table is utilized.

FIG. 5 shows configuration screens for additional information in the case the status table of FIG. 4 has been created. Once a user selects "Status Configuration" in "Main Menu" shown in FIG. 5, "Status Selection Window" shown in FIG. 5 will be displayed. Each status shown in "Status Selection Window" corresponds to the statuses configured in the status table of FIG. 4. Once one of the statuses is selected, "Person List" shown in FIG. 5 will be displayed. Once one of the persons is selected, a registration message is created based on the configured additional information and the certification information. The registration message is then sent to the mobile phone of the person via the mobile communication network.

(2) Structure of Registration Message

FIG. 6 is a conceptual view of the structure of a registration message. The registration message shown in FIG. 6 includes sender, receiver, predetermined tag, and contents of certification information and additional information. The sender (From:) and receiver (To:) specify the user and the person to whom the registration message is sent, such as the name of the user or mobile phone number. The tag indicates the beginning and end of the access ID, and the beginning and end of the additional information. In FIG. 6, the tags for indicating the beginning and end of the access ID are <IDENTIFY> and </IDENTIFY>. The tags for indicating the beginning and end of the additional information are <PHONEBOOK> and </PHONEBOOK>.

The contents of the access ID include access ID that corresponds to the communication service of the user. For instance, "ID(I"Taro Fujitsu","Mobile" )=******" indicates that the certification ID (also referred to as an access ID) for the mobile phone service of the user "Taro Fujitsu" is "******".

The contents of additional information include information that specifies the user, additional information, and communication ID. For instance, "SET("Taro Fujitsu", "Mobile")=("Emergency only","******",1)" indicates that the mobile phone service is now "available" to the user "Taro Fujitsu", the priority is "1", message is "Emergency only", and that the communication ID is "******". Usually, the user coincides with the sender. However, if the sender is a special server such as a server that stores statuses of users, the person being called may not be the same as the sender. In FIG. 6, "1", "2", indicate the priorities of the communication services, as well as that the communication services are "available". On the other hand, "0" indicates that the communication service is "not available".

Figure 7:
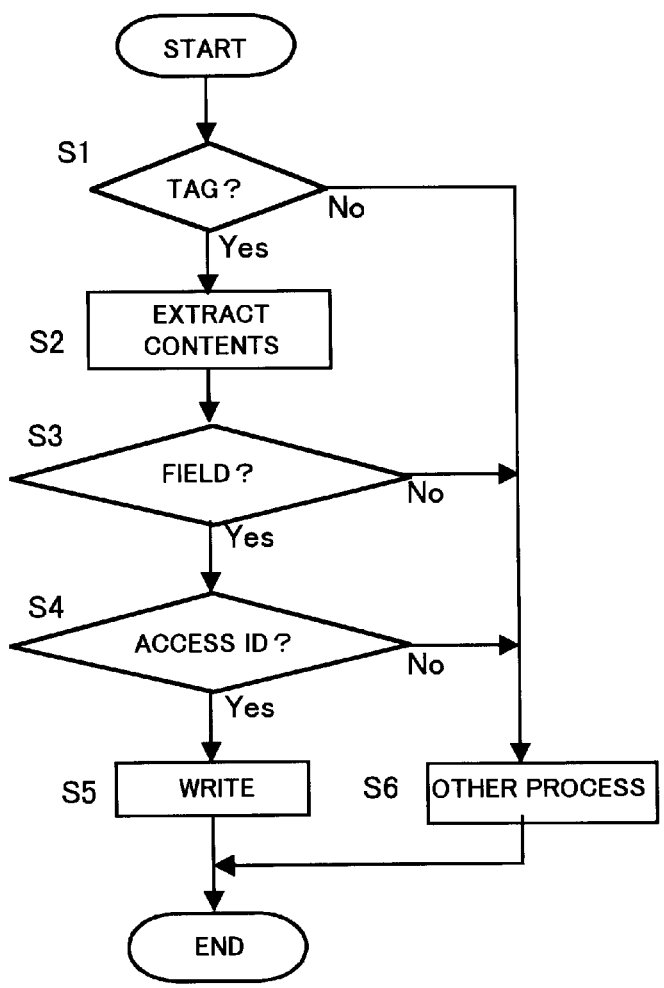
FIG. 7 is a flowchart showing the process of receiving a registration message in accordance with the present invention.

(3) Processes of Sending and Receiving Registration Message (a) The process flow of sending and receiving the aforementioned registration message by the mobile phone will now be explained. FIG. 7 is a flowchart of the receiving process. Once the mobile phone receives data, the following process starts.

At step S1, the receive controller 25 examines whether or not received data includes predetermined tags. If the data includes the tags, the receive controller 25 proceeds to step S2. Otherwise, the receive controller 25 proceeds to step S6.

At step S2, the receive controller 25 extracts from the received data contents of the certification information and the additional information that are described following the tags. Then, the receive controller 25 sends the contents of the certification information and the additional information to the administrator 26.

At step S3, the administrator 26 determines the person that corresponds to the information in the registration message. Then the administrator 26 examines whether the person is listed in the phonebook. In other words, the administrator 26 examines whether the communication parameter and the access ID of the person are registered in the phonebook. If the person is already registered in the phonebook, then the administrator 26 proceeds to step S4. Otherwise, the administrator 26 proceeds to step S6.

At step S4, the administrator 26 retrieves the access ID from the contents, and compares the access ID with the access ID in the phonebook. If two access IDs match, then the administrator 26 proceeds to step S5. Otherwise, the administrator 26 proceeds to step S6.

At step S5, the administrator 26 writes the contents of the additional information and the communication ID that it received under the additional information and the communication ID of the person in the phonebook. The process ends.

At step S6, the administrator 26 executes other processes such as error handling process. For instance, the administrator 26 sends to the sender of the registration message an error message such as "Could not access Mr. XXX's phonebook".

Figure 8:
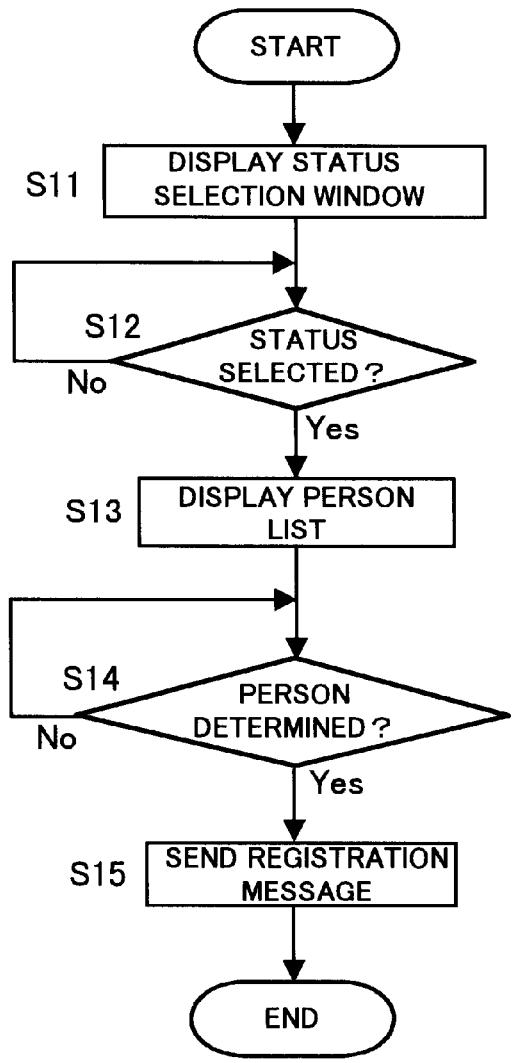
FIG. 8 is a flowchart showing the process of sending a registration message in accordance with the present invention.

(b) FIG. 8 is a process flowchart for sending the registration message. For the sake of simplification, steps in the flowchart depicted in FIG. 8 will be explained along with the sending process shown in the screens of FIG. 5. The sending process depicted in FIG. 5 is similar to the sending process shown in FIG. 3, except that the sending process in FIG. 3 has different procedures for configuring the additional information. As "Status Configuration" is selected in the main menu depicted in FIG. 5, the following process starts.

At step S11 in FIG. 8, the display controller 27 displays "Status Selection Window" shown in FIG. 5.

At step S12, the selection controller 28 waits until one of the statuses is selected. Once a status is selected, the selection controller 28 reports the selected status to the administrator 26.

At step S13 the administrator 26 retrieves from the memory portion 24 the names of the persons listed in the person list. The administrator 26 then sends the names to the display controller 27. The display controller 27 displays the person list as shown in FIG. 5.

At step S14 in FIG. 8, the selection controller 28 waits until the person to whom the registration message should be sent is determined. More specifically, the selection controller 28 waits until the send button of the mobile phone is pushed, or until the button that confirms the inputted selection is pushed. The selection controller 28 then reports the selection of the person to the administrator 26.

At step S15, the administrator 26 refers to the status table (depicted in FIG. 4) to retrieve the additional information that corresponds to the status selected at step S12. The administrator 26 also retrieves from the certification information table shown in FIG. 2B the communication ID and access ID that correspond to each communication service. The administrator 26 then attaches predetermined tags to the access ID, the additional information, and the communication ID, thereby creating a registration message in a predetermined format. The administrator 26 further retrieves from the person list shown in FIG. 2C the mobile phone number of the selected person. The administrator 26 sends the registration message and the mobile phone number of the person to the send controller 29.

At step S16, the send controller 29 executes sending process to send the registration message to the reported phone number. The registration message is sent.

Preferably, the aforementioned person list should be created by entering (and recording) the user name and the mobile phone number of persons being called into the phonebook of the mobile phone 2. Selection of the additional information should be made as needed and thereafter the mobile phone sends a communication parameter to another mobile phone. In this way, the persons to whom the communication parameter has been sent are registered in the phonebook. Therefore, the user does not have to register persons to whom the additional information of the phonebook is sent, separately from registration of the phonebook. Also, a user can create a person list by simply sending out communication parameters such as phone number.

Communication Utilizing Additional Information (1) Next, communication that utilizes the additional information will be described. For the sake of simplification, the following explanation is based on an example in which the mobile phone has a phonebook shown in FIG. 2A.

Figure 9:
FIG. 9 is an explanatory view showing an example of a screen displaying additional information in accordance with the present invention.

Due to the process that displays the phonebook to let the user select a person to call, the display controller 27 displays "Person Selection Window" as shown in FIG. 9. The "Person Selection Window" displays the names of the persons in the phonebook, along with the communication services that are designated as priority "1" by each person. Once the user selects one of the persons and pushes the send button, "Process Notification Window" shown in the lower portion of FIG. 9 will be displayed. The "Process Notification Window" displays the selected person, communication services, and communication addresses, along with the statuses of communication. The "Process Notification Window" is displayed by the display controller 27 by a conventional process.

FIG. 10 shows an alternate example of a window that is displayed after a person is selected in the aforementioned "Person Selection Window". For instance, when the communication service that the person designated as priority "1" is not a convenient communication service to the user, the user may want to select the service that is convenient for him out of the communication services available to the person. In this example, once the user selects a person in the aforementioned "Person Selection Window", "Service Selection Window" shown in the lower portion of FIG. 10 is displayed.

The "Service Selection Window" displays communication services available to the selected person, along with the priorities and messages for each communication service. In this screen, the communication service that the person designates as "not available" is crossed out, to visually let the user know that the communication service is not available. Once a communication service is selected in "Service Selection Window", the communication process based on the selected communication service starts. Then, "Process Notification Window" shown in the lower portion of FIG. 9 is displayed. It is also possible to set "Person Selection Window" shown in FIG. 10 such that all available communication services, instead of only the highest priority communication service, are displayed for each person.

FIG. 11 shows examples of screens that accept selection of the communication service that a person has designated as "not available". When the user selects a person in "Person Selection Window" shown at the top of FIG. 11, "Service Selection Window" shown in a mid-portion of FIG. 11 is displayed. The "Service Selection Window" in this example is the same as the "Service Selection Window" shown in FIG. 10, except that the user can select the communication service that the person designated as "not available". For instance, when the user selects "Work", which is designated as "Not Available", "Confirmation Window" shown at the bottom of FIG. 11 appears. The "Confirmation Window" displays messages indicating that the selected communication service is designated as not available, and confirming whether the user wishes to communicate by the communication service anyway. If the user selects "Y" in this screen, communication based on the selected communication service starts.

If additional information that corresponds to the person is not registered, communication takes place by displaying the phonebook data.

Figure 12:
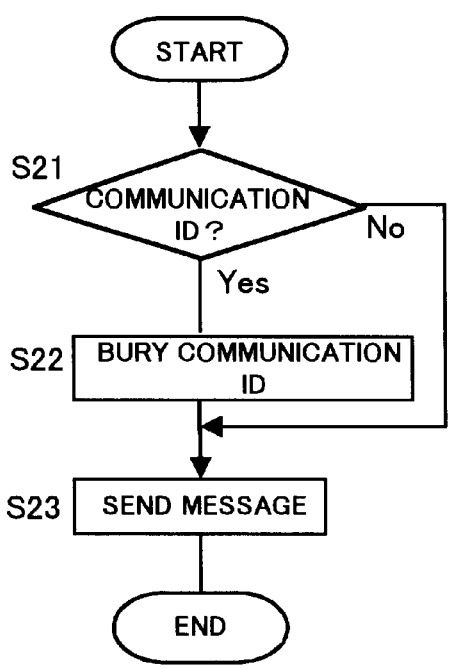
FIG. 12 is a flowchart showing the communication certification process utilizing communication ID, executed by a sending mobile phone in accordance with the present invention.

(2) Communication ID (2-1) Communication utilizing communication ID in the phonebook is now explained. FIG. 12 is a flowchart of communication certification process that takes place in the mobile phone that requests communication. For instance, following process starts after the user determines which person should be called and by which communication service in FIG. 10. For the sake of simplification, it is assumed herein that short messaging service has been selected.

At step S21, the administrator 26 examines whether the communication ID that corresponds to the person's short messaging service is configured in the phonebook. If the result of the examination is "Yes", then the administrator 26 retrieves the communication ID for short messaging service from the phonebook. The administrator 26 then sends the communication ID to the send controller 29. The administrator 26 proceeds to step S22. If the result of the examination is "No", the administrator 26 proceeds to step S23.

At step S22, the send controller 29 buries (hides) the communication ID in the text message data that is to be sent out. Thereby, the communication ID is inserted in the text message data along with predetermined tags that indicate the communication ID.

At step S23, the send controller 29 sends out the text message data based on the protocol of the short messaging service.

Figure 13:
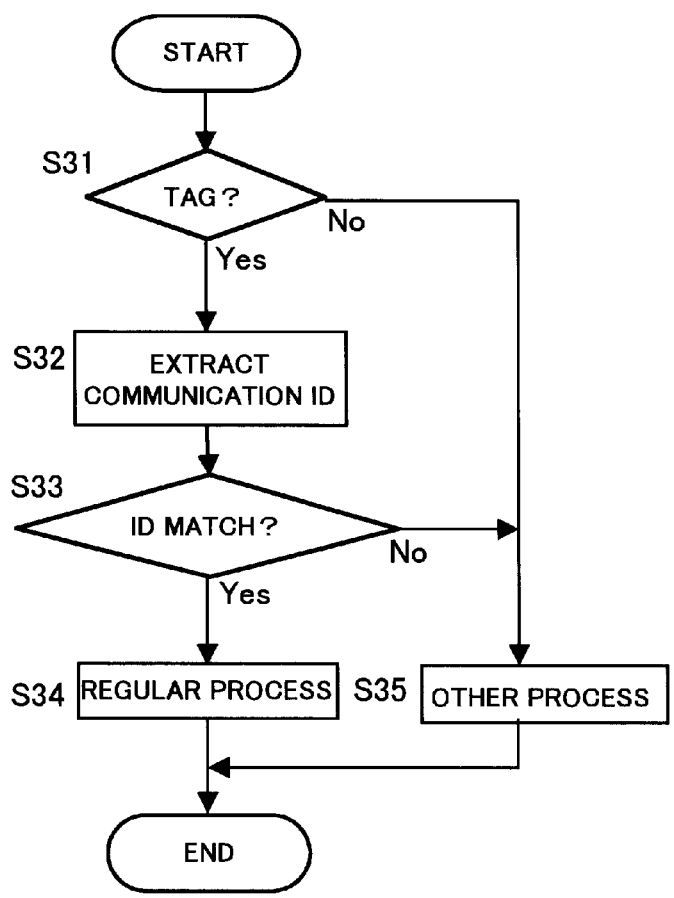
FIG. 13 is a flowchart showing a communication certification process utilizing communication ID, executed by a receiving mobile phone in accordance with the present invention.

(2-2) FIG. 13 is a flowchart of communication certification process that a mobile phone that received the short message executes. Once the mobile phone receives a data, the following process starts.

At step S31, the data that the mobile phone received is sent from the sender/receiver 23 to the receive controller 25. The receive controller 25 examines whether the data includes predetermined tags. If the result of the examination is "Yes", then the receive controller 25 proceeds to step S32. If the result is "No", then the receive controller 25 proceeds to step S35.

At step S32, the receive controller 25 extracts from the data the communication ID and the text message body that are included following the tags. Then the receive controller 25 sends the communication ID and the text message body to the administrator 26.

At step S33, the administrator 26 examines whether the communication ID of the short messaging service according to the certification information table coincides with the communication ID it received. If two communication IDs match, then the administrator 26 proceeds to step S34. Otherwise, the administrator 26 proceeds to step S35.

At step S34, the processes that a mobile phone executes when it received a short message are executed.

At step S35, the mobile phone executes predetermined other processes, because the communication ID did not coincide with the communication ID in the certification information table, or because the data did not include communication ID. For instance, the mobile phone executes error handling process by sending a text message such as "This communication is not permitted." To the sending mobile phone.

(3) Access ID

Certification process utilizing access ID has already been explained in the aforementioned receive process of the registration message. Therefore, explanation of certification process based on access ID will be omitted.

OTHER EMBODIMENTS

In the above-described first embodiment, the additional information is sent and received directly to and from mobile phones. The additional information can also be sent out via other communication paths. It is also possible to set up a collection server that collects user statuses, and have the collection server send out additional information to mobile phones. In this case, the person list should be held by the collection server, although each mobile phone has a person list in the first embodiment.

It is also possible to connect the communication network with a computer network such as the Internet via a gateway device, and connect the aforementioned collection server to the gateway device. The collection server stores user statuses detected by a user status detection system that operates on the Internet. The collection server also stores additional information sent from the mobile phones. The collection server has a person list for each mobile phone, and sends to mobile phones user statuses on the Internet or mobile communication network at appropriate timings. The timing can be, for instance, when a user status has changed. It is also possible to allow a user to register conditions, such that timings for sending a user status are determined as when the condition has been satisfied. As described above, a mobile phone displays user status for particular person and particular communication service. For instance, when user status of user A is "On Business Trip" or "In Meeting", the mobile phone displays text messages such as "Not Available", "On Business Trip", or "In Meeting" for work phone service.

A user status detection system that operates on the Internet can detect user status such as "In", "Out", "In Meeting", and "On Business Trip", based on the status of the screen saver, the frequency of input in an application, user's schedule, and user's position as detected by infrared.

Effect of the Invention

The present invention allows a user to know the person's status in advance, such that the user can conduct communication with the person in a way that suits the person's situation. Also, the present invention has certification information that corresponds to data inside a mobile communication terminal. In this manner, rewriting and update of the data inside a mobile communication terminal can be controlled.

SECOND EMBODIMENT

Figure 14:
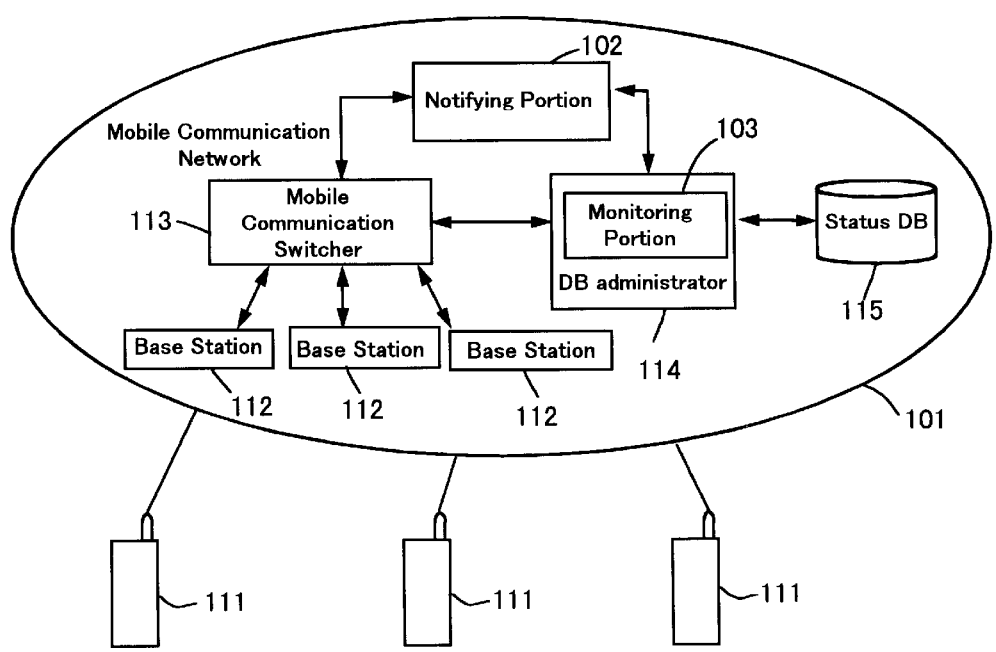
FIG. 14 is a functional block view of a status notification system in accordance with a second embodiment of the present invention.

FIG. 14 shows an entire structure of a status notification system in accordance with the second embodiment of the present invention. The mobile communication system shown in FIG. 14 includes a conventional mobile communication system, with notifying portion 102 (sending means) and monitoring portion 103 (detecting means) added thereto. The notifying portion 102 and the monitoring portion 103 are connected to a mobile communication network.

The mobile communication system includes the mobile communication network 101 and a plurality of mobile terminals 111. The mobile communication network 101 includes a plurality of base stations 112, a mobile communication switcher 113, a DB administrator 114, and a status DB 115. The each of the base station 112 communicates with the mobile terminals 111 when one of the mobile terminal 111 is within a predetermined area serviced by one of the base stations 112. The base stations 112 send and receive signals to and from the mobile terminals 111. The mobile communication switcher 113 sends and receives data to and from the plurality of base stations 112, other mobile communication switchers, and fixed-line telephone network. As the mobile communication switcher 113 receives a request for call from a mobile terminal 111, the mobile communication switcher 113 updates the communication status of that mobile terminal 111. Then, the mobile communication switcher 113 notifies the DB administrator 114 of the change in the communication status. The DB administrator 114 records the communication status of the mobile terminal according to the notification from the mobile communication switcher 113. Examples of communication status to be recorded include "No Communication", "Line Busy", "Out of Area" or "Turned Off", and "In which Area".

(1) Notifying Portion 102

Figures 15, 16:
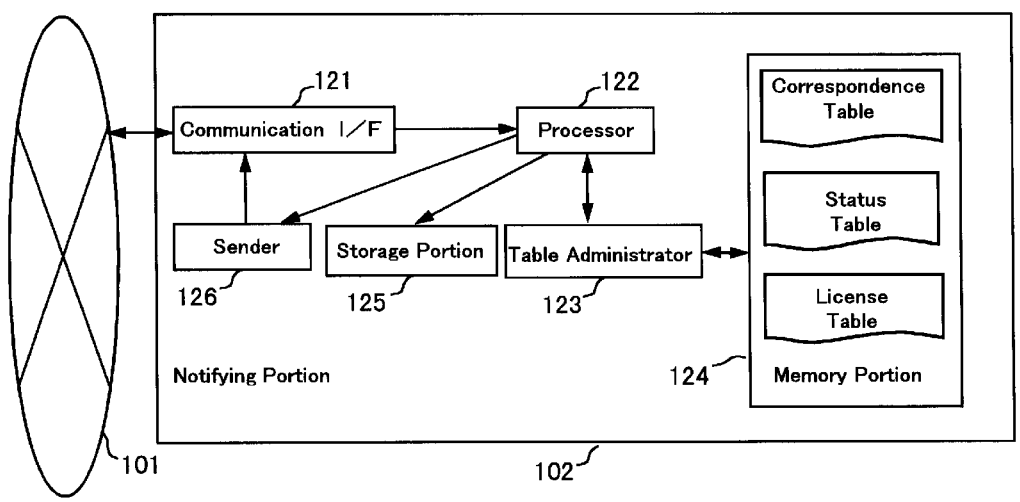
FIG. 15 is a block view showing functions of a notifying portion 102 for use in the status notification system in accordance with the present invention.
FIG. 16 is a conceptual explanatory view of a correspondence table used in the status notification system in accordance with the present invention.

FIG. 15 is a block chart that illustrates operation of the notifying portion 102. The notifying portion 102 includes a communication interface (I/F) 121, a processor 22, a table administrator 123, a memory portion 124, a storage portion 125, and a sender 126.

Referring to data stored in the memory portion 124, the memory portion 124 includes a correspondence table, a license table, and a status table. FIG. 16 is an example of the correspondence table. The correspondence table stores addresses of monitorors, addresses of monitorees, and conditions for notification, such that the monitorors' and monitorees' addresses and conditions for notification correspond with one another. As will be described below, the addresses and the conditions are configured by "monitorors". A monitoror is a user who receives notifications regarding statuses of other users who are being monitored. The monitorees are users whose status is monitored and changes in status are reported to the monitoror. Communication addresses that specify each mobile communication terminal are utilized as the "monitoror's address" and the "monitoree's address". In this embodiment, the communication address is phone number. "Condition for Notification" defines conditions when changes in the status of a monitoree are notified to the monitoror, more specifically, of what kind of status changes of the monitoree are to be reported to the monitoror. For instance, if "Condition for Notification" is "All", the monitoree notifies all changes in status to the monitoror. If "Condition for Notification" is "Callable", the monitoree notifies the monitoror of current status only when the monitoree's communication status becomes "Callable". A user's communication status becomes "Callable" when, for instance, the mobile terminal of the monitororoee enters "Within Area", or when the monitoree finishes the previous call and gains "No Communication" status.

FIG. 17 is a conceptual view to explain the license table. The license table includes monitorors' addresses, monitorees' addresses, corresponding conditions for notification and actions. As is explained in more detail, it is the monitoree that configures these entries. "Monitoror's address" and "Monitoree's address" are the same as in the aforementioned correspondence table. "Condition for notification" defines conditions, upon satisfaction of which the monitoree allows or does not allow report to the monitoror.

"Action" defines whether the status of the monitoree should be reported to the monitoror when monitoree's status satisfies "Condition for Notification". For instance, if "Condition for Notification" is "Callable", and "Action" is "Allow", the monitoree allows notification of a status change to the monitoror when the status becomes "Callable". In other words, "Notification Request", which will be explained later, can be registered in the correspondence table in this case. If "Condition for Notification" is "All", and "Action" is "Reject", the status of the monitoree is not reported to the monitoror at all. In other words, registration of "Notificaiton Request" in the correspondence table is not allowed.

It is also possible to enter and store in the license table only conditions for allowing notification, such that all the other statuses not entered in the license table are "Rejected". In this case, only notification requests from monitorors that are specifically identified and designated are listed in the correspondence table. This configuration is preferable from the point of view of maintaining privacy.

FIG. 18 is a conceptual view to explain the status table. The status table stores user names, along with corresponding communication addresses, statuses 1, and statuses 2. In this embodiment, "Status 1" includes communication statuses of users reported by the monitoring portion 103. In other words, examples of "Status 1" include "No Communication", "Line Busy", "Within Area", and "Out of Area" or "Turned Off". "Status 2" includes users' own statuses of mobile terminals. For instance, examples of "Status 2" include "Call at Night", "Anytime", and "Emergency Only". A user himself can report his own "Status 2" from his mobile terminal to the notifying portion 102. "Status 2" can be reported to the notifying portion 102 by a conventional user status detection system that automatically detects user statuses. In this embodiment, users' own statuses are reported to the notifying portion 102 from each mobile terminal in the form of an own status notice that is in a predetermined format.

If a user has a plurality of communication addresses registered, "Status 2" for communication addresses that under the user name can be updated all at once when each user's own status is reported. In this manner, the system avoids a contradictory situation where the status of the same user is different for different mobile terminals.

The communication I/F 21 sends and receives data to and from the mobile communication network 101. More specifically, the communication I/F 121 sends data that it receives to the processor 122. The communication I/F 121 also sends data it received from the sender 126 to the communication network 101.

The processor 122 conducts processes according to the type of data it received. When the processor 122 receives a status notification of a user from the monitoring portion 103, the processor 122 determines based on the correspondence table who should be notified. The processor 122 then creates a notification message to be sent thereto, which includes the user status. The processor 122 executes similar process when a mobile terminal sends its own status to the processor 122. The processor 122 then determines based on the status table whether a user to whom the notification message is sent can receive the message. If the user cannot receive the message, the name of the user and the notification message are sent to the storage portion 125.

The processor 125 also directs the table administrator 123 to update the status table based on a status notification sent from the monitoring portion 103 or an own status notification from a mobile terminal. A status notification and an own status notification will be described in more detail below.

Further, when the processor 122 receives a notification request or notification cancellation request from a mobile terminal, the processor 122 directs the table administrator 123 to update the correspondence table according to the license table. Upon update of the correspondence table, the processor 122 also notifies the monitoring portion 103 of the content of the update. Furthermore, the processor 122 directs the table administrator 123 to update the license table when the processor 122 receives a license registration request. A license registration request is described in more detail later.

The table administrator 123 updates the correspondence table and license table as it is directed to do so by the processor 122. The storage portion 125 temporarily stores a notification message when the user to whom the notification message was sent is uncallable. The storage portion 125 sends the stored notification message to the sender 126 as it is directed to do so by the processor 122. The sender 126 sends notification messages that are sent from the processor 122 and the storage portion 125 to designated users.

(2) Monitoring Portion 103

Figures 19, 20:
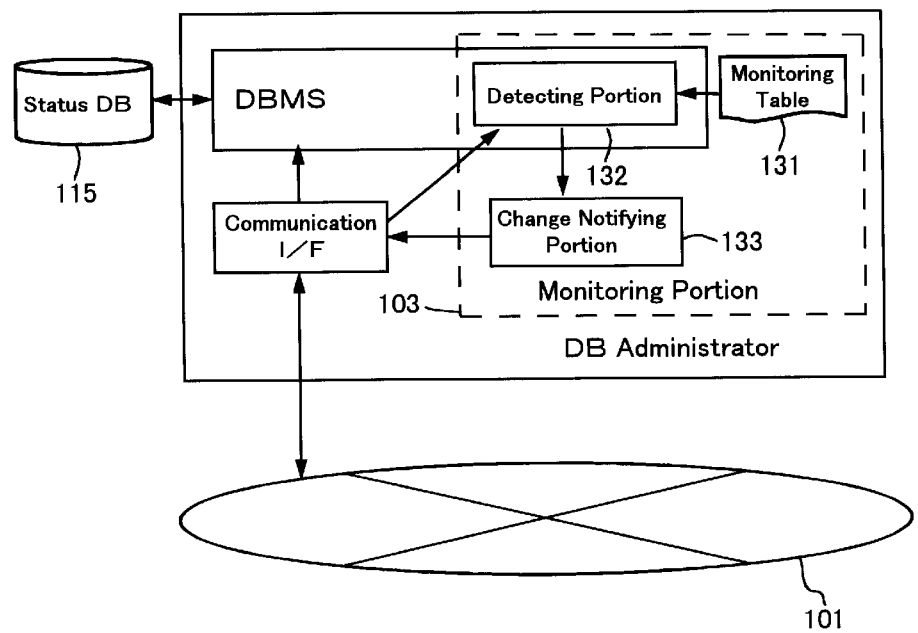
FIG. 19 is a block view to explain functions of a monitoring portion 103 used in the status notification system in accordance with the present invention.
FIG. 20 is a conceptual explanatory view of a monitoring table 131 used in the status notification system in accordance with the present invention.

FIG. 19 is a block chart that explains functions of the monitoring portion 103. In this embodiment, the monitoring portion 103 includes a DB administrator 114. The DB administrator 114 includes a DBMS (Database Management System), and administers a status DB 115. The status DB 115 stores communication statuses of mobile terminals. The DB administrator 114 sends and receives communication statuses via the communication interface (I/F).

The monitoring portion 103 includes a monitoring table 131, a detecting portion 132, and a change notifying portion 133.

FIG. 20 is an example of the monitoring table 31. The monitoring table 131 stores monitorees' addresses and corresponding conditions for notification. The monitoring table 131 is updated as the detecting portion 132 receives from the notifying portion 102 an update notification for the correspondence table. Therefore, monitorees, monitorees' addresses, and conditions for notification are the same as those in the correspondence table.

The detection portion 132 is installed in the DBMS for detecting a command to write to the status DB. Once the detecting portion 132 detects the aforementioned command, the detecting portion 132 determines according to the monitoring table 131 whether the new communication status should be reported to the notifying portion 132. In other words, the detecting portion 132 determines whether a user whose communication status has changed is one of the monitorees, and whether the new communication status satisfies the condition for notification. Once it is determined that the new communication status should be reported, the detecting portion 132 sends the new communication status and the name of the monitoree to the change notification portion 133. The change notification portion 133 creates a status notification that includes the communication status and the name of the monitoree, and sends the status notification to the notifying portion 102.

(3) Mobile Terminal 111

(3-1) Structure

The mobile terminal (for instance, a mobile phone) is described below. A mobile terminal generally includes a memory portion, a memory administrator, a communication controller, a communicator, and a user I/F (Not shown in Figures). A memory portion stores text messages, phonebook, and information regarding the mobile terminal itself, which it receives. The phonebook usually stores persons and their corresponding communication addresses. The memory administrator writes and reads information to and from the memory portion. The communication controller executes processes according to signals from outside and/or user's operations. The communicator sends and receives signals to and from the mobile communication network. The user I/F accepts user's operations, and notifies the user of appropriate information by sounds and/or display.

Figures 21, 22:
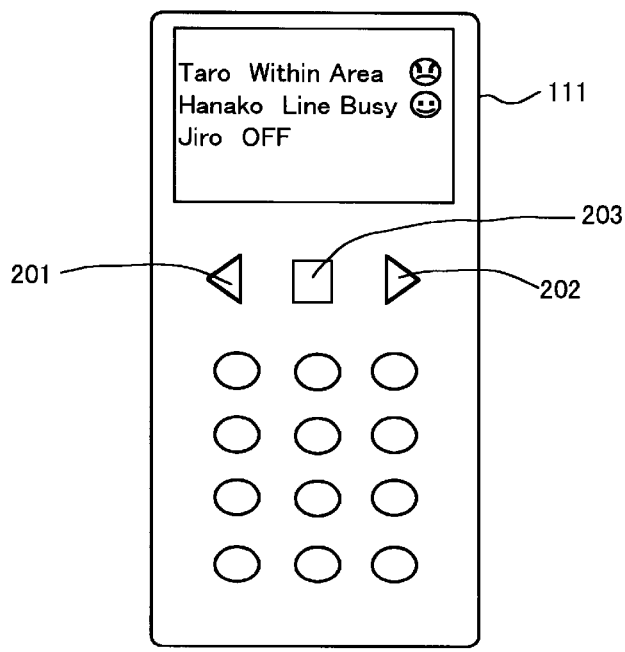
FIG. 21 is a conceptual explanatory view of a phonebook that stores user statuses used in the status notification system in accordance with the present invention.
FIG. 22 is an explanatory view showing an example of user statuses displayed visually on a mobile terminal.

In the present embodiment, phonebook information includes persons' user statuses, as well as names and phone numbers. FIG. 21 is a conceptual view showing a phonebook that stores user statuses. The phonebook stores names, phone numbers, registration flags, and statuses 1 and 2, such that they all correspond to one another. "Registration flag" shows whether the person's status should be reported. If "Registration flag" is "ON", predetermined statuses of the person will be reported to the mobile terminal. If "Registration flag" is "OFF", the person's statuses will not be reported. "Status 1" corresponds to the status 1 of the aforementioned status table. "Status 1" includes communication statuses of mobile terminals that are reported to the notifying portion 102. "Status 2", corresponds to the status 2 of the aforementioned status table. "Status 2" includes own statuses of mobile terminals which are to be reported to the notifying portion 102.

FIG. 22 is an example of how user status is displayed in one of the mobile terminals 111 that has the phonebook. As shown in FIG. 22, the shortened name "Taro" representing "Taro Fujitsu" is now within the area, and wishes to be called at night(see FIG. 25 for icon definition). Also, the shortened name "Hanako" representing "Hanako Fujitsu" is now in "Line Busy" status, but otherwise is callable anytime. Although "Statuses 2" are shown as graphical images in FIG. 22, they can also be shown as text messages. The mobile terminal shown in FIG. 22 further includes selection buttons 201 and 202, and a confirmation button 203.

(3-2) Display

Figure 23:
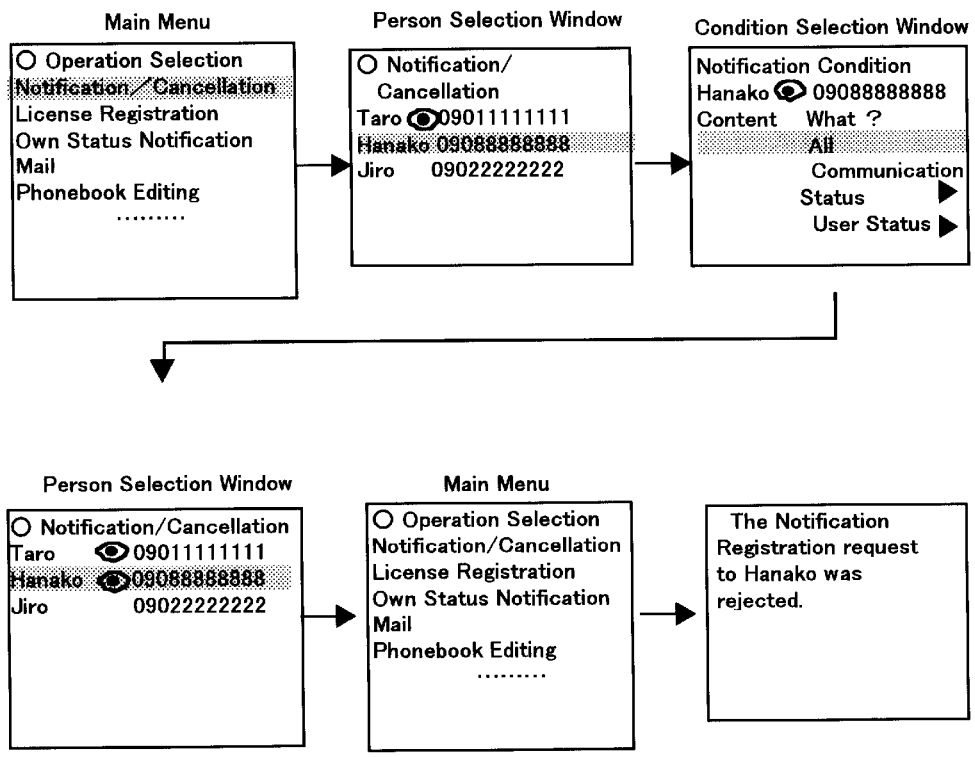
FIG. 23 is a view showing examples of screens for requesting or canceling notification of user status, including: examples of a Main Menu; examples of a person selection window; an example of condition for notification window; and an example of message displayed.

Referring to FIG. 23, displays of a mobile terminal for selecting a person and requesting or canceling a notification of user status are explained. Usually, a user can select predetermined operations such as mailing and phonebook editing from a Main Menu displayed in the mobile terminal. In the present embodiment, the Main Menu (FIG. 23) displays "Notification Request/Cancellation", "License registration", and "Own Status Notification", as well as regular operations.

(3-2-1) Displays of Notification Request/Cancellation

Once a user selects "Notification Request/Cancellation" in the Main Menu as shown in FIG. 23, "Person Selection Window" shown in the upper center of FIG. 23 is displayed. This window displays whether a registration flag is on or off for each person. In the upper center portion of FIG. 23, the registration flag for "Taro" is on, as indicated by the eye shaped icon. Once a user selects a person, "Condition Selection for Window" shown at the upper right portion of in FIG. 23 is displayed.

The Condition Selection Window accepts a selection of condition, either "All", "Communication Status", or "User Status". If "All" is selected, the user is notified of the new status every time a status change occurs to the person. If "Communication Status" is selected, a pull-down menu will be displayed, whereby the user selects a communication status of which he wishes to be notified. The pull-down menu displays communication statuses such as "All", "Within Area", "Outside Area or Turned Off", "Line Busy", and "Callable". If "User Status" is selected, a pull-down menu will be displayed, whereby the user selects a user status of which he wishes to be notified. The pull-down menu displays user statuses such as "All", "Call at Night", "Anytime", and "Emergency Only". A user may be able to select more than one options under the pull-down menu. Referring to FIG. 23, "All" is selected as condition for notification.

Once a condition is selected, the aforementioned "Person Selection Window" is displayed again as shown in the lower left hand portion of FIG. 23. In this screen, the registration flag for Hanako, who has been selected earlier, is on. The user can also request a status notification from other person by selecting the person and the condition for notification in a similar manner. The user can also change the condition for notification for other persons whose registration flags are on, by selecting the person and the condition for notification in a similar manner.

When a request for notification is confirmed by, for instance, pushing the confirmation button twice, the request for notification is sent to the notifying portion 2. Then, the screen shows the Main Menu, lower center of FIG. 23 again. If the request for notification sent to the notifying portion 102 is not accepted, a screen with a predetermined message will be displayed, as shown at the bottom right portion of FIG. 23. Cancellation of request for notification can also be configured in a similar manner.

(3-2-2) Screens for License Registration

Figure 24:
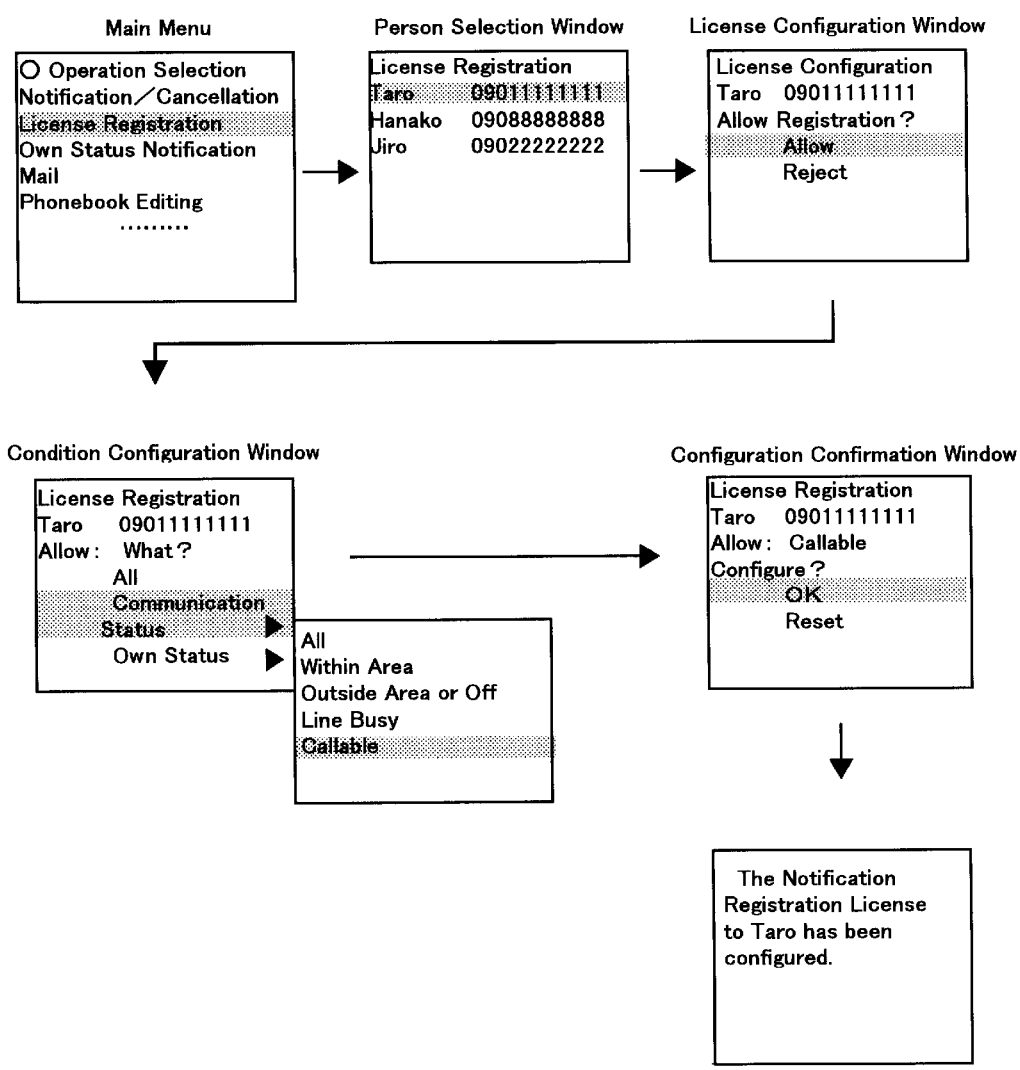
FIG. 24 is a view showing examples of screens for configuring status tables, including: a main menu; an example person selection window; an example of class configuration window; an example of condition configuration window; an example of configuration confirmation window; and an example of end of configuration screen.

Referring to examples of displays shown in FIG. 24, operations for configuring the license table from a mobile terminal is now explained. FIG. 24 shows examples of screens for configuring the license table. Once the user selects "License Registration" in the Main Menu (upper left in FIG. 24), "Person Selecting Window" shown FIG. 24 is displayed. Once the user selects a person, "License Configuration Window" shown at the upper right portion of FIG. 24 is displayed. This window accepts selection of whether or not a status should be reported to the selected person. Once the user makes a selection, "Condition Configuration Window", as shown in the lower left portion of FIG. 24 is displayed.

"Condition Configuration Window" accepts configuration of status that should be or should not be reported. A status can be selected from "All", "Communication Status", and "Own Status". The statuses are similar to "All", "Communication Status", and "User Status" in the condition for notification window shown in FIG. 23. If "Communication Status" or "Own Status" is selected, a pull-down menu will be displayed as in the aforementioned condition for notification window. The user then selects a specific status. Referring to FIG. 24, notification of status "Callable" is "Allowed" to the selected person. On the other hand, notification of own status is not allowed under this configuration.

Next, "Configuration Confirmation Window" shown at the middle right side of FIG. 24 is displayed. As the user selects "OK", a license registration request will be sent to the Notifying portion 2. Then a confirmation end screen is displayed (bottom of FIG. 24). If the user selects "Reset", the "License Configuration Window" shown top right side of FIG. 24 is displayed again, such that the user can redo the configuration.

(3-2-3) Screens for Own Status Notification

Figure 25:
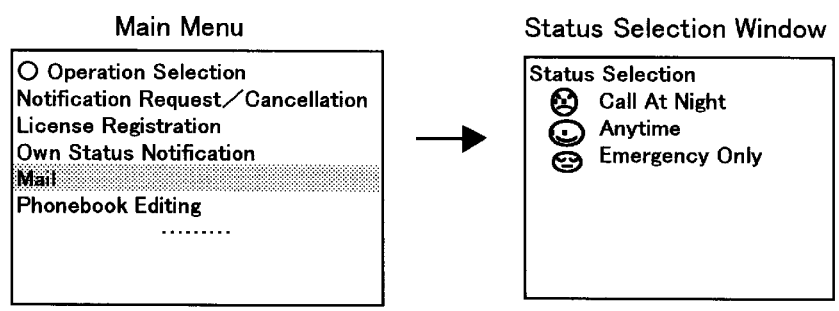
FIG. 25 is a view showing examples of screens for designating notification conditions for status updates, including: a main menu; and an example of status selection window.

FIG. 25 shows examples of screens where a mobile terminal reports its own status to the notifying portion 2. If the user selects "Notify Own Status" in the Main Menu at the left in FIG. 25, "Status Selection Window" shown on the right hand side of FIG. 25 is displayed. "Status Selection Window" displays selections such as "Call at Night", "Anytime", and "Emergency only", along with graphic images for each status. Once the user selects a status and pushes a confirmation button, a notification of own status will be sent to the notifying portion 102.

[Process Flow Chart]

Flow of processes that are executed by a status notification system in accordance with the present embodiment is now described.

(1) Process of Notifying Portion 102

Figure 26:
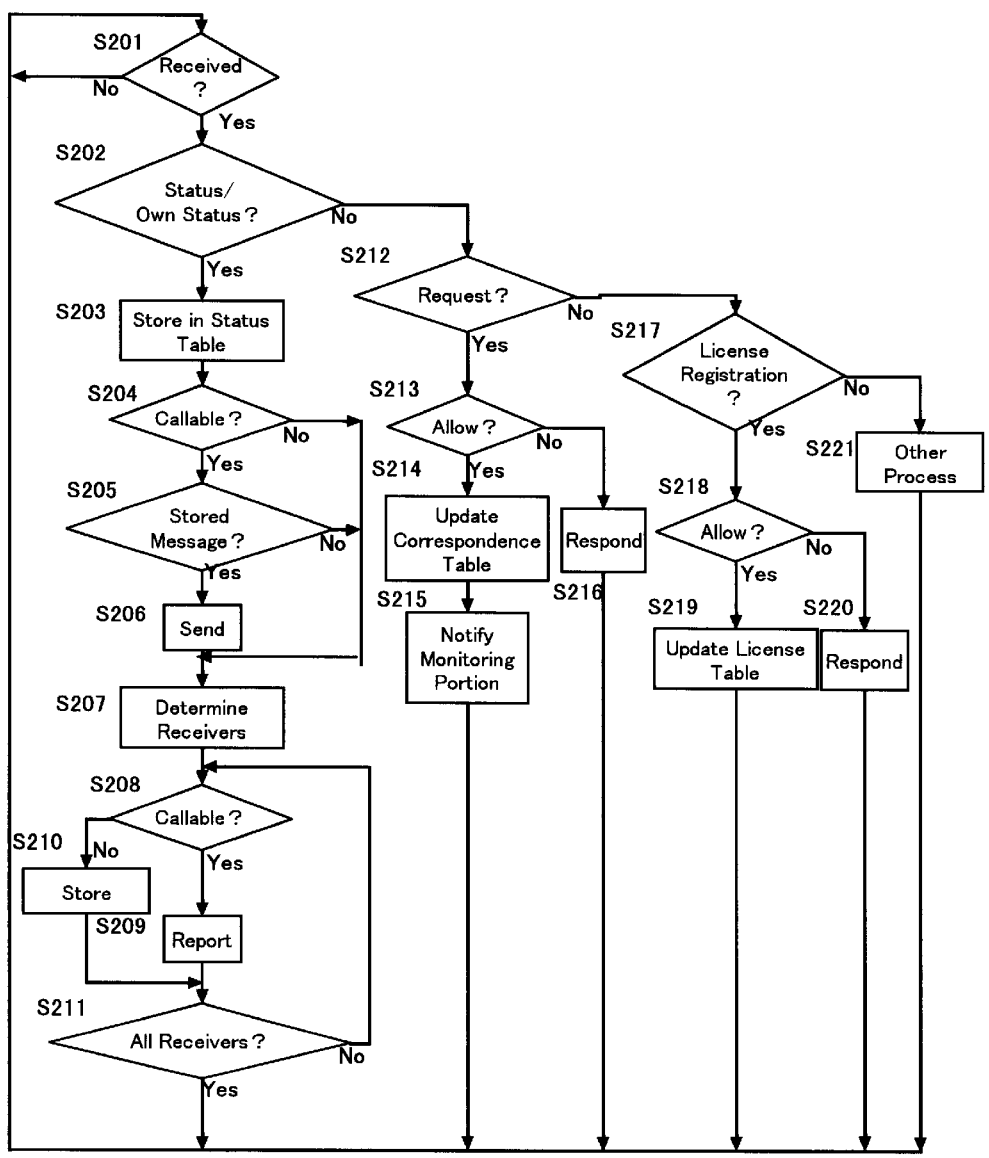
FIG. 26 is a flowchart showing the process executed by notifying portion 102 in accordance with the present invention.

FIG. 26 is a flowchart of process executed by the notifying portion 102.

At step S201, the communication I/F waits until it receives a signal. Once the communication I/F receives a signal, the communication I/F sends the signal it received to the processor 122.

At step S202, the processor 122 executes process that corresponds to the signal it received. First of all, the processor 122 determines whether or not the signal it received is either a status notification that came from the monitoring portion 103 or a notification of own status that came from a mobile terminal 111. If the determination is "Yes", the processor 122 proceeds to step S204. If the determination is "No", the processor 122 proceeds to step S212.

At step S203, the processor 122 writes in the status table communication status of the mobile terminal or own status of the user, depending upon whether the signal is a status notification or a notification of own status.

At step S204, if the notification that the processor 122 received is a status notification, the processor 122 determines whether or not the notification is to notify that the person is now callable. For instance, notifications that notify that the communication status is "Within Are" or "No Communication" are such notifications. If the determination is "Yes", then the processor 122 proceeds to step S205. If the notification is either a notification of own status or other type of notification then the processor 122 proceeds to step S207.

At step S205, the processor 122 transmits the name of the mobile terminal that is now callable to the storage portion 125. The storage portion 125 determines whether or not the storage portion 125 has a message addressed to the mobile terminal which it has received the name of. If the storage portion 125 has a message, the storage portion 25 proceeds to step S206. Otherwise, the storage portion proceeds to step S207.

At step S206, the storage portion 125 sends the stored notification message to the designated mobile terminal via the sender 126. In other words, since the mobile terminal has been uncallable, the mobile terminal has not be notified of the notification message. Now that the mobile terminal is callable, the mobile terminal can be notified of the new user status. If the storage portion 125 stores more than one notification messages designated to the same mobile terminal, the storage portion 125 may send only the latest notification message, and delete other old notification messages.

At step S207, the processor 122 determines receivers of the new user status based on the correspondence table. First of all, the processor 122 directs the table administrator 123 to retrieve addresses and conditions for notification of the monitorors and their conditions for notification. The table administrator 123 retrieves from the correspondence table the addresses and conditions for notification of monitorors who designate as its monitoree the user in which the status change occurred. Then the table administrator 123 notifies the addresses and conditions to the processor 122. The processor 122 determines receivers by selecting monitorors whose conditions for notification match the new user status.

At step S208, the processor 122 determines based on the status able whether or not the receivers determined in step S207 are able to receive the notification message. First of all, the processor 122 directs the table administrator 123 to retrieve data from the status table. The table administrator 123 then retrieves statuses of the receiver mobile terminals, and sends the retrieved statuses to the processor 122. If a receiver is callable, the processor 122 creates a notification message that is in a predetermined format, and sends the notification message to he sender 126 along with the address of the receiver. Then, the processor 122 proceeds to step S209. If all receivers are uncallable, the processor 122 proceeds to step S210.

At step S209, the sender 126 sends the notification message to the addresses of the receivers.

At step S210, the processor 122 sends the names of the receivers and the notification messages to the storage portion 125. The storage 125 stores the notification message and the receivers such that they correspond to one another.

At step S211, the processor 122 determines whether or not the notification message has been either sent or stored for all receivers. If the determination is "No", the processor 122 returns to the aforementioned step S208, to repeat the process according to the status of the receiver. If the determination is "Yes", then the processor 122 returns to the step S201 to repeat the aforementioned process.

If the signal the processor 122 received is not a status notification or a notification of own status at the aforementioned step S202, the processor 122 then proceeds to step S212. At step S212, the processor 122 determines whether or not the signal it received is either a request for notification or a request for cancellation of notification sent by a mobile terminal. If the determination is "Yes", the processor proceeds to step S213. If the determination is "No", the processor proceeds to S217.

At step S213, the processor 122 determines whether or not the request for notification or request for cancellation of notification that it received should be allowed, based on the license table. In other words, once the processor 122 receives a request for notification, the processor 122 extracts identification of the monitoror and monitoree, and transmits the identification to the table administrator 123. The table administrator 123 retrieves from the license table condition and action that correspond to the reported monitoror. The table administrator 123 then sends the condition and action to the processor 122. The processor 122 determines whether or not the request for notification should be allowed, based on condition for notification in the request for notification, and the condition and action retrieved from the license table. If the request is to be allowed, the processor 122 proceeds to step S214. If the request is not to be allowed, the processor 122 proceeds to step S216. If the signal it received is a request for cancellation of notification, the processor 122 determines that the request for cancellation should be allowed.

At step S214, the processor 122 determines condition for notification that is to be configured in the correspondence table. The condition for notification is determined based on the condition described in the request for notification, and the condition and action retrieved from the license table. Then, the processor 22 notifies the table administrator 123 of the determined monitoror, monitoree, and condition for notification. The table administrator 123 writes the reported contents in the correspondence table.

At step S215, the processor 122 creates an update notification that includes the monitoree and the condition for notification. The update notification is in a predetermined format. The processor sends the update notification to the monitoring portion 103 via the sender 126. The monitoring portion 103 updates the monitoring table based on the update notification. Then, the notifying portion 102 returns to step S201 to repeat the aforementioned lower right side of FIG. 23.

If the processor 122 determines not to allow the request for notification at step S213, the processor 122 then proceeds to step S216. At step S216, the processor 122 creates a response message to inform that the request for notification cannot be allowed. Then the processor 122 sends the response message to the mobile terminal that sent the request for notification. The mobile terminal that receives the response message will display a screen as shown in the aforementioned FIG. 23(*f*).

If the processor 122 determines that the signal it received is neither a request for notification nor a request for cancellation of notification at step S212, then the processor 122 proceeds to step S217. At step S217, the processor 122 determines whether or not the signal it received is a request for license registration. If the determination is "Yes", the processor 122 proceeds to step S218. If the determination is "No", the processor 122 proceeds to step S221.

At step S218, the processor 122 determines based on the corresponding address whether or not the request for license registration that it received should be allowed. More specifically, the request is allowed if the communication address of the sender of the request and the corresponding address match. If the request is allowed, the processor 122 proceeds to step S219. If the request is not allowed, the processor 122 proceeds to step S220.

At step S219, the processor 122 extracts predetermined contents from the request for license registration that it received. Then the processor 122 sends the contents to the table administrator 123. The table administrator 123 writes the reported contents in the license table.

At step S220, the processor 122 creates a message, such as to inform that the request for license registration cannot be allowed. The processor 122 sends the message to the mobile terminal that sent the request. Then, the processor 122 returns to step S201.

If the signal that the processor 122 received is determined not to be a request for license registration at step S217, the processor 122 proceeds to step S221. At step S221, the processor 122 executes other processes such as error handling process. Then, the processor 122 returns to step S201.

(2) Process of Monitoring Portion 103

Figure 27:
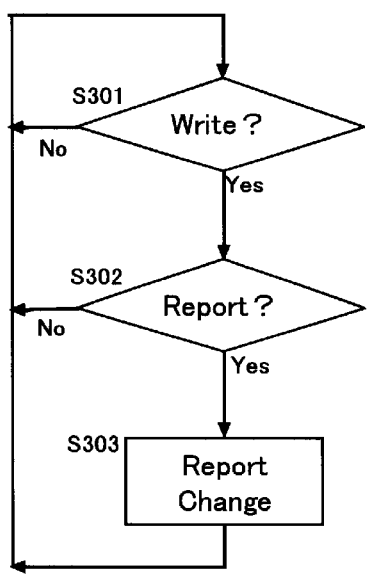
FIG. 27 is a flowchart showing a monitoring process executed by monitoring portion 103 in accordance with the present invention.

FIG. 27 is a flowchart of a monitoring process executed by the monitoring portion 103. As the DB administrator 114 starts, the following process starts.

At step S301, the detecting portion 132 waits until there is a write command directed to the status DB. Once a write command occurs, then the detecting portion 132 proceeds to step S302.

At step S302, the detecting portion 132 determines based on the monitoring table 131 whether or not a communication status that has just been written in the status DB should be reported to the notifying portion 102. In other words, the detecting portion 132 determines whether the mobile terminal to which a status change occurred is a monitoree, and whether the new status satisfies the condition for notification. If the determination is "Yes", then the detecting portion 132 proceeds to step S303. If the determination is "No", then the detecting portion 132 returns to step S301.

At step S303, the detecting portion 132 reports the new communication status and the name of the mobile terminal to the change notifying portion 133. The change notifying portion 133 creates a status notification that is in a predetermined format. The change notifying portion 133 then sends the status notification to the notifying portion 102. Then, the detecting portion 132 returns to step S301.

The monitoring portion 103 also executes update process of the monitoring table 131, as well as the aforementioned monitoring process. In other words, the detecting portion 132 updates the monitoring table 131 as it receives an update notification from the notifying portion 102. If the detecting portion 132 receives an updated notification that originates from a request for notification, the detecting portion 132 also adds the corresponding address and the condition for notification. If the detecting portion 132 receives an updated notification that originates from a request for cancellation of notification, then the detecting portion deletes the corresponding entries from the monitoring table 131.

(3) Process of Mobile Terminal

Figure 28:
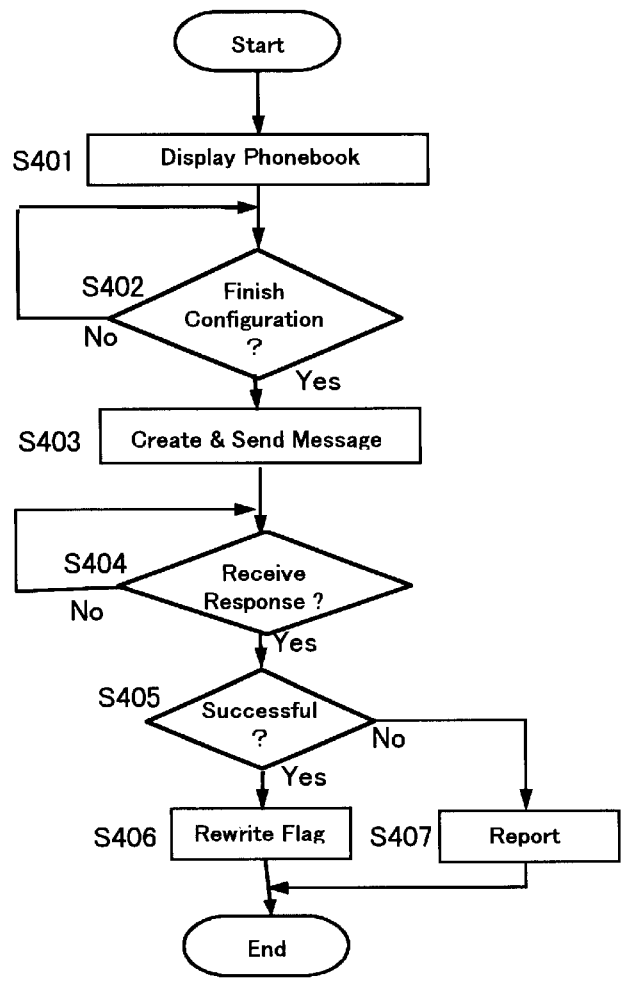
FIG. 28 is a flowchart showing the notification request/cancellation process executed by a mobile terminal in accordance with the present invention.

FIG. 28 is a flowchart of request for notification/cancellation process executed by a mobile terminal. As the user selects "Request Notification/Cancellation" in the main menu, the following process starts. The process for displaying the main menu is similar to a conventional one for a mobile phone, and therefore will not be explained in detail.

At step S401, the user I/F reads and displays the phonebook. At the same time, the user I/F also displays whether or not persons, registration flag is "On".

At step S402, the user I/F sends the name of selected person and condition for notification to the communication controller. In other words, the user I/F accepts selection of monitoree and condition for notification. The communication controller waits until the user finishes the configuration, and then proceeds to step S403. In other words, the communication controller determines that the configuration has been finished if the confirmation button is pushed twice in a row.

At step S403, the communication controller creates a request for notification or a request for cancellation of notification, which includes the configured contents. The communication controller then sends the request to the notifying portion 102 via the communicator.

At step S404, the communication controller waits until it receives a response to the request that it sent. Once the communication controller receives a response, the communication controller proceeds to step S405.

At step S405, the communication controller executes a process that corresponds to the response it received. If the request has been configured successfully, the communication controller proceeds to step S406. If configuration of the request failed, the communication controller proceeds to step S497.

At step S406, the communication controller directs the memory administrator to update the phonebook. If the request for notification has been successful, the memory administrator rewrites the registration flag as "On". If the request for cancellation of notification has been successful, the memory administrator rewrites the registration flag as "Off".

At step S407, the communication controller notifies the user that configuration of the request for notification or cancellation of notification has failed (as shown at the bottom right side of FIG. 23).

OTHER EMBODIMENTS (A) In the previous embodiment, the monitoring portion 103 is formed integrally with the DB administrator 114. However, the monitoring portion 103 does not necessarily have to be formed integrally with the DB administrator 114, as long as the monitoring portion 103 can monitor changes that occur in the status DB. Also, the notifying portion 102 does not necessarily have to be on the mobile communication network, as long as the notifying portion 102 can receive a status notification from the monitoring portion 103 and send a notification message to mobile terminals.

(B) In the aforementioned embodiment, the monitoring portion 103 includes the DBMS and the detecting portion 132 installed therein. However, the detecting portion 132 can also be formed outside the DBMS. In this case, the detecting portion 132 checks update history of the status DB, which the DBMS stores, every predetermined period of time. Then the detecting portion 132 compares the update history with the update history from the previous period. If the result of the comparison indicates any change in the status DB, the detecting portion 132 determines based on the monitoring portion 131 whether the new communication status should be reported to the notifying portion 102.

(C) It is also preferable to set an expiration time in configuration of a request for notification and/or a license registration in the correspondence table and/or the license table. The notifying portion checks every predetermined period of time whether any of the entries has expired. If there is an entry that has expired, the notifying portion deletes the entry. In this manner, the user does not have to make a request for cancellation of notification or a request for cancellation of license registration. Also, the network does not have to bear unnecessary burden from unwanted requests for notification.

(D) It is also possible to install more than one notifying portions 102 for one monitoring portion 103. For instance, a mobile communication network provider may provide a service in which user statuses are reported to mobile terminals that are connected to different mobile communication networks. In this case, the monitoring portion 103 can have a notifying portion for each mobile communication network. The monitoring table of the monitoring portion 103 stores identification information of notifying portion and corresponding address, such that they correspond to one another. When a status change that satisfies the condition for notification occurs in a corresponding address, the monitoring portion 3 reports the status change to the notifying portion that corresponds to the address.

Figure 29:
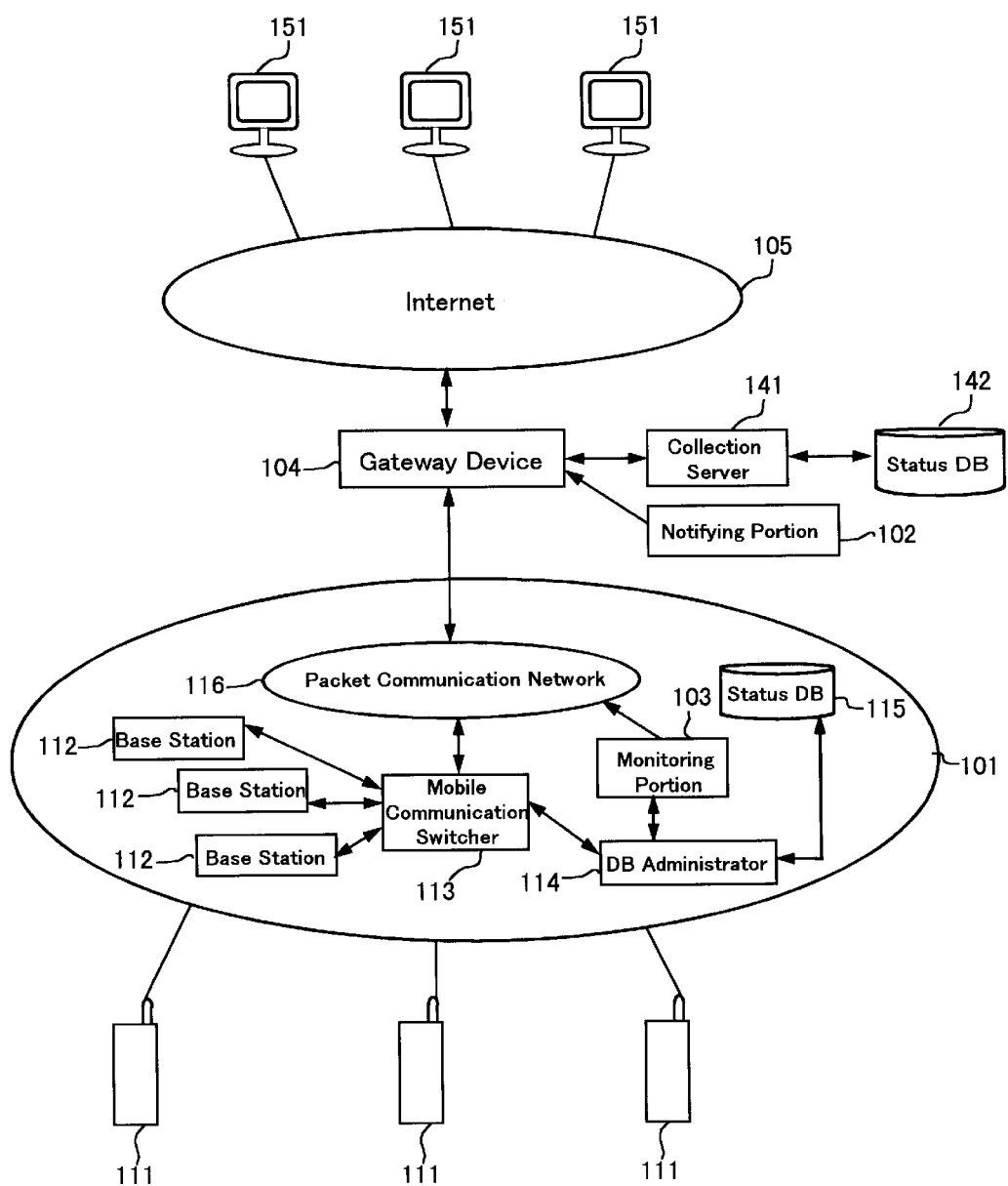
FIG. 29 is a functional block view of a status notification system in accordance with a third embodiment of the present invention.

(E) FIG. 29 is a block view of a status notification system in accordance with another embodiment of the present invention. In the status notification system of this embodiment, the mobile communication network 101 and a computer network 105 such as the internet are connected to each other via a gateway device 104.

The mobile communication network 101 includes the monitoring portion 103. A user status detection device (not shown in figure) and information terminals 151 are connected to the internet 105. The user status detection device operates on an information terminal for detecting user status based on activation status of screen saver, frequency of input in an application, user's schedule, and user's position as detected by infrared. Then the user status detection device can send the result of detection to outside.

The gateway device 104 has a collection server 141 and the notifying portion 102 connected thereto. The collection server 141 collects user statuses from the information terminals 151 via the internet 105. The user statuses collected are stored in an all status DB 42. Examples of user status includes "In", "In Meeting", "Stepping Out", "Busy", and "On Business Trip". In lieu of the notifying portion 102, the collection server 141 also receives status notifications from the monitoring portion 103 and notifications of own status from mobile terminals. Then, the collection server 141 stores user statuses on the mobile communication network 101 in the all state DB 42. In other words, the collection server 141 integrally administers statuses collected from the internet and statuses collected from the mobile communication network.

The notifying portion 102 has a similar structure as in the structure of the notifying portion in the first embodiment, except that the status table is replaced with the all state DB 42 administered by the collection server 41. Also, the notifying portion 102 monitors status changes in the all state DB 42. If a status change occurs in the all state DB 42, the monitoring portion 103 sends a notification message to mobile terminals 111 according to the correspondence table.

The correspondence table and license table can utilize addresses such as IP address as an address for monitoror and/or monitoree, other than phone number of a mobile terminal. The notifying portion 102 determines based on the correspondence table who should be notified of the status change. In this case, a user status that should be reported to a mobile terminal can be the address that is best suited to the user status. For instance, if the communication status of a monitoree is "Outside Area or "Turned Off", the monitoree's electronic mail address or phone number he can be reached at during the business trip can be reported, in stead of the communication status itself. It is also possible to notify mobile terminals of an own status of a user as is detected by the user status detection device installed in an information terminal. Examples of such own status entries include "In Meeting" and "Stepping Out".

On the other hand, the notifying portion can also send communication statuses on the mobile network 101 and/or own statuses of users to information terminals 151 according to the correspondence table. By correlating user information on the mobile network and user information that is administered by the user status detection device or an address book system that operates on an information terminal 151, a user can refer to user information on the mobile communication network 101 from an application.

Furthermore, a user can configure requests for notification and requests for cancellation of notification and requests for license registration from an information terminal on the internet. In this manner, operation of configuration is further simplified.

According to the present invention, a user who uses a mobile terminal can know in advance a status of his callee. Therefore, the user can make a call in a manner that suits the situation of the callee. Also, a user can selectively notify his callees of his own status. Therefore, the user can protect his privacy.

While several embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A communication control method for use in a mobile communication terminal, the mobile communication terminal having a phonebook that correlates persons, communication services, and communication addresses, the mobile communication terminal sending and receiving phonebook data remotely, the communication control method comprising:

receiving predetermined additional information remotely, the additional information relating to a status of a communication service of a person registered in the phonebook;

storing the received additional information, with the additional information, the communication service, and the person registered in the phonebook corresponding to one another; and outputting, based on the stored additional information, a status of the communication service for the person registered in the phonebook.

2. A mobile communication terminal having a phonebook correlating persons, communication services, and communication addresses, and sending and receiving phonebook data remotely, said mobile communication terminal comprising:

an additional information table storing predetermined additional information with the additional information, communication services, and persons corresponding to one another, the additional information indicating a status of a communication service for a person registered in the phonebook;

administration means for receiving the additional information remotely and writing the additional information in said additional information table; and output control means for outputting the status of the communication service for the person registered in the phonebook based on the additional information.

3. The mobile communication terminal as set forth in claim 2, wherein:

the additional information includes a flag that indicates whether or not each of the communication services are available to the person; and said output control means displays information indicating whether the communication service is available to the person.

4. The mobile communication terminal as set forth in claim 2, wherein:

the additional information comprises an availability priority designated by the person to the communication service; and said output control means outputs based on the designation of the availability priority of the communication service.

5. The mobile communication terminal as set forth in claim 2, wherein:

the additional information comprises visual information indicating designations of communication services selected by the person; and the output control means displays persons, communication services, and the visual information with the persons, the communication services, and the visual information corresponding to one another.

6. The mobile communication terminal as set forth in claim 2, further comprising:

a communication certification table storing certification information with the certification information, persons, and communication services corresponding to one another, the certification information being utilized in requesting communication by the communication service to a person registered in the phonebook; and reporting means for reporting to the person the certification information that corresponds to the communication service, in requesting communication by the communication service.

7. The mobile communication terminal as set forth in claim 2, further comprising:

certification means for storing certification information that is utilized in determining authorization of a request for communication by another mobile communication terminal, and determining authorization of transmission of a communication based on the certification information sent by the mobile communication terminal.

8. The mobile communication terminal as set forth in claim 2, further comprising:
   an access information table storing access information with the access information corresponding to the persons and communication services, the access information deciding whether update of additional information should be allowed,
   wherein said administration means receives the additional information and the access information remotely, compares the received access information and the stored access information, and updates said additional information table with the received additional information based on a result of the comparison.

9. The mobile communication terminal as set forth in claim 2, further comprising: p1 data entry means for accepting configurations of additional information and a person, with the additional information corresponding to a communication service and the person corresponding to the additional information, and sending the configured additional information to the person.

10. The mobile communication terminal as set forth in claim 9, further comprising:
   a status table storing predetermined statuses and predetermined additional information regarding a communication service such that the statuses correlate with the additional information,
   wherein said data entry means accepts selection of the predetermined statuses and configures additional information for the communication service based on the selected status.

11. The mobile communication terminal as set forth in claim 9, wherein
   said data entry means comprises a person list having addresses of persons to which additional information is sent, and an address of a person is written in the person list when the phonebook data have been sent to the person.

12. A computer-readable recording medium having a communication control program therein, said communication control program being used in a mobile communication terminal that stores a phonebook and sends and receives phonebook data remotely, the phonebook correlating persons, communication services, and communication addresses, said communication control program executing a process of:
   receiving predetermined additional information remotely, the additional information relating to a status of a communication service of a person registered in the phonebook;
   storing the received additional information, the additional information being correlated with the communication service and the person registered in the phonebook; and
   outputting, based on the stored additional information, a status of the communication service for the person registered in the phonebook.

13. A status notification method for use in a mobile communication system having a plurality of mobile communication terminals and a mobile communication network, each of the mobile communication terminals communicating with the mobile communication network, the mobile communication network administering communication statuses of the mobile communication terminals, said status notification method comprising:
   extracting changes in the communication status of at least one of the mobile communication terminals;
   sending the extracted communication status to others of the mobile communication terminals via the mobile communication network, regardless of whether the others of the mobile communication terminals communicated with the at least one of the mobile communication terminals having the change in communication status;
   storing the extracted communication status in the other mobile communication terminals; and
   outputting the stored communication status at the other communication terminals in accordance with a desired configuration.

14. A status notification system used in a mobile communication system having a plurality of mobile communication terminals and a mobile communication network, the mobile communication terminals communicating via and with the mobile communication network, the mobile communication network administering communication statuses of the mobile communication terminals, said status notification system comprising:
   detecting means for detecting changes in the communication status of a mobile communication terminal of the plurality of mobile communication terminals and retrieving identification of the mobile communication terminal and the new communication status from the mobile communication network; and
   sending means for sending the identification of the mobile communication terminal and updated communication status to others of the plurality of mobile communication terminals via the mobile communication network in response to detection of the changes in the communication status, regardless of whether the others of the mobile communication terminals communicated with the mobile communication terminal having the change in communication status;
   each of the plurality of mobile communication terminals having storing means for storing the identification of the mobile communication terminal and corresponding updated communication status, and each of the plurality of mobile communication terminals having status outputting means for outputting the stored communication status of other communication terminals according to a desired configuration.

15. The status notification system as set forth in claim 14, wherein
   said detecting means comprises a monitoring table, said detecting means detecting changes in the communication status of the mobile communication terminal according to said monitoring table, said monitoring table having recorded therein identification of monitored terminals selected from the plurality of mobile communication terminals, the monitored terminals having communication status being detected.

16. The status notification system as set forth in claim 15, wherein
   said sending means comprises a correspondence table that lists identification of monitoring terminals selected from the plurality of mobile communication terminals, the monitoring terminal designated to receive updates of communication status of selected ones of the monitored terminals, said sending means determining, based on said correspondence table, which of the monitoring terminals is to receive updates of communication status for specified monitored terminals.

17. The status notification system as set forth in claim 16, wherein:
   said correspondence table stores conditions for sending the communication status along with identification of corresponding ones of the monitored terminals and monitoring terminals; and said sending means determines based on said conditions in said correspondence table which communication status is to be sent.

18. The status notification system as set forth in claim 16, wherein:

said sending means receives from one of the mobile communication terminals a predetermined send request that specifies one of the monitored terminals, and registers and updates said correspondence table based on the send request; and each of the mobile communication terminals comprises configuring means for selecting a configuration for a send request and sending the configuration to said sending means.

19. The status notification system as set forth in claim 18, wherein:

said sending means sends to said detecting means predetermined information based on updated contents in response to said sending means updating said correspondence table in response to receiving a send request from a mobile communication terminal; and said detecting means comprises a monitoring table, said detecting means detecting a change in the communication status of a mobile communication terminal in accordance with said monitoring table, and said detecting means updating said monitoring table according to the predetermined information sent from said sending means, said monitoring table having registered therein identification of the monitored terminals.

20. The status notification system as set forth in claim 18, wherein:

said sending means comprises a license table correlating the monitoring terminals, the monitored terminals, and availability flags, the availability flag indicating whether the communication status of the monitored terminal is designated to be sent to the monitoring terminal; and said sending means updates said correspondence table in accordance with said license table in response to a send request sent from a mobile communication terminal.

21. The status notification system as set forth in, claim 20, wherein:

said sending means receives from one of the mobile communication terminals a license registration request that specifies a monitored terminal and an availability flag, and updates said license table according to the license registration request; and the mobile communication terminals further comprise license configuring means for accepting configuration of a license registration request and sending the configuration to said sending means.

22. The status notification system as set forth in claim 14, wherein:

said sending means further comprises a status table storing the identification of the mobile communication terminals and corresponding user statuses, the user statuses being separate from the communication statuses;

said sending means receives a user status from a mobile communication terminal and writes the user status in said status table;

in response to changes in a user status, said sending means is adapted to send the user status and identification of a corresponding mobile communication terminal to other mobile communication terminals; and the mobile communication terminals further comprise user status configuring means for accepting configuration of the user status and sending the configuration to said sending means.

23. A monitoring device used with a mobile communication network that communicates with a plurality of mobile communication terminals, the mobile communication network administering communication statuses of the mobile communication terminals, the monitoring device, in response to changes in communication status in one mobile communication terminal, retrieving a new communication status of the mobile communication terminal and sending identification of the mobile communication terminal and the new communication status to other mobile communication terminals, regardless of whether the other mobile communication terminals communicated with the mobile communication terminal having the change in communication status.

24. The monitoring device as set forth in claim 23, further comprising detecting means for detecting changes in the communication status of the mobile communication terminals and having a monitoring table containing identifications of monitored mobile communication terminals selected from the plurality of mobile communication terminals, the communication status being detected for the monitored mobile communication terminals.

25. The monitoring device as set forth in claim 23, wherein said detecting means updates said monitoring table according to predetermined information of which mobile communication terminals are to receive updates of the communication status for the monitored mobile communication terminals.

26. A sending device used with a mobile communication network that communicates with a plurality of mobile communication terminals, the mobile communication network detecting a change in the communication status of each mobile communication terminal and sending out a new communication status, said sending device sending identification of a mobile communication terminal and a new communication status of the mobile communication terminal to other mobile communication terminals via the mobile communication network regardless of whether the other mobile communication terminals communicated with the mobile communication terminal having the change in communication status, the identification of the mobile communication terminal and the new communication status being sent from the mobile communication network.

27. The sending device as set forth in claim 24, comprising sending means for sending the identification of the mobile communication terminal and the new communication status, said sending means having a correspondence table that lists identification of monitoring terminals selected from the plurality of mobile communication terminals, the monitoring terminals designated to receive updates of communication status of selected ones of monitored terminals, said sending means determining, based on said correspondence table, which of the monitoring terminals is to receive updates of communication status for specified monitored terminals.

28. The sending device as set forth in claim 27, wherein:

said correspondence table stores conditions for sending the communication status along with identification of corresponding ones of the monitored terminals and monitoring terminals; and said sending means determines, based on said conditions in said correspondence table, which communication status is to be sent.

29. The sending device as set forth in claim 27, wherein:

said sending means receives from one of the mobile communication terminals a predetermined send request that specifies one of the monitored terminals, and registers and updates said correspondence table based on the send request; and each of the mobile communication terminals comprises configuring means for selecting a configuration for a send request and sending the configuration to said sending means.

30. The sending device as set forth in claim 29, wherein:

said sending means sends predetermined information based on updated contents in response to said sending means updating said correspondence table in response to receiving a send request from a mobile communication terminal.

31. The sending device as set forth in claim 29, wherein:

said sending means comprises a license table correlating the monitoring terminals, the monitored terminals, and availability flags, the availability flags indicating whether the communication status of the monitored terminal is designated to be sent to the monitoring terminal; and said sending means updates said correspondence table in accordance with said license table in response to a send request sent from a mobile communication terminal.

32. The sending device as set forth in claim 31, wherein:

said sending means receives from one of the mobile communication terminals a license registration request that specifies a monitored terminal and an availability flag, and updates said license table according to the license registration request; and the mobile communication terminals further comprise license configuring means for accepting configuration of a license registration request and sending the configuration to said sending means.

33. The status notification system as set forth in claim 27, wherein:

said sending means further comprises a status table storing the identification of the mobile communication terminals and corresponding user statuses, the user statuses being separate from the communication statuses;

said sending means receives a user status from a mobile communication terminal and writes the user status in said status table;

in response to changes in a user status, said sending means sends the user status and identification of a corresponding mobile communication terminal to other mobile communication terminals; and the mobile communication terminals further comprise user status configuring means for accepting configuration of the user status and sending the configuration to said sending means.

34. A mobile communication terminal used in a mobile communication network, the mobile communication network storing identification information for identifying other mobile communication terminals and displaying the stored identification information, said mobile communication terminal comprising:

storing means for storing the communication statuses of other mobile communication terminals from the mobile communication network, and storing the communication statuses in correspondence with the identification information, the statuses of the other mobile communication terminals being received and stored when the communication statuses change regardless of whether the mobile communication terminal communicated with the other mobile communication terminals having the change in communication status; and display means for displaying the identification information and the stored communication status such that they correspond with one another.

35. The mobile communication terminal as set forth in claim 34, wherein:

the mobile communication network comprises sending means for sending the identification of the mobile communication terminal and updated communication status to the other mobile communication terminals via the mobile communication network in response to detection of the changes in the communication status; and each of the mobile communication terminals comprises configuring means for selecting a configuration for a send request and sending the configuration to said sending means.

36. The mobile communication terminal as set forth in claim 35, wherein the mobile communication terminals comprise license configuring means for accepting configuration of a license registration request and sending the configuration to said sending means.

37. The mobile communication terminal as set forth in claim 34, wherein the mobile communication terminals comprise user status configuring means for accepting configuration of user status and sending the user status configuration to said sending means.

38. A mobile communication terminal used on a mobile communication network, the mobile communication network storing a phonebook that correlates persons and communication addresses, the mobile communication network displaying the phonebook according to configuration, the mobile communication terminal comprising:

storing means for storing the communication status of a person from the mobile communication network, and storing the communication status in correspondence with the person; and display means for displaying the stored communication status along with the phonebook when the phonebook is displayed.

39. A computer-readable recording medium having a send program stored therein, the send program used in an information terminal that connects with a mobile communication network that communicates with a plurality of mobile communication terminals, the mobile communication network detecting a change in communication statuses of the mobile communication terminals and sending out a new communication status, said send program executing a process of:

receiving identification of the mobile communication terminal and the new communication status sent from the mobile communication network; and sending the identification of the mobile communication terminal and the new communication status to other mobile communication terminals via the mobile communication network, regardless of whether the other mobile communication terminals communicated with the mobile communication terminal having the change in communication status.

40. The computer-readable recording medium as set forth in claim 39, further comprising listing, in a correspondence table, identification of monitoring terminals selected from the plurality of mobile communication terminals, the monitoring terminals designated to receive updates of communication status of selected ones of monitored terminals, and determining, based on the correspondence table, which of the monitoring terminals is to receive updates of communication status for specified monitored terminals.

41. The computer-readable recording medium as set forth in claim 40, further comprising:

storing, in the correspondence table, conditions for sending the communication status along with identification of corresponding ones of the monitored terminals and monitoring terminals; and determining, based on the conditions in the correspondence table, which communication status is to be sent.

42. The computer-readable recording medium as set forth in claim 40, further comprising:

receiving, from one of the mobile communication terminals, a predetermined send request that specifies one of the monitored terminals, and registering and updating the correspondence table based on the send request; and selecting a configuration for a send request.

43. The computer-readable recording medium as set forth in claim 42, further comprising:

sending predetermined information based on updated contents in response to updating the correspondence table in response to receiving a send request from a mobile communication terminal; and detecting a change in the communication status of a mobile communication terminal in accordance with a monitoring table, and updating the monitoring table according to the predetermined information, the monitoring table having registered therein identification of the monitored terminals.

44. A computer-readable recording medium having a display control program stored therein, the display control program used in a mobile communication terminal on a mobile communication network, the mobile communication network storing a phonebook that correlates persons and communication addresses, the mobile communication network displaying the phonebook according to a configuration, the display control program executing a process of:

receiving the communication status of a person from the mobile communication network and storing the communication status to correspond with the person; and displaying the stored communication statuses along with the phonebook when the phonebook is displayed.

45. A status notification system, comprising:

a computer network having information terminals connected thereto, said computer network detecting a user status;

a mobile communication network to which mobile communication terminals are connected;

a gateway device connecting said computer network and said mobile communication network;

status storing means for storing user statuses on said computer network, corresponding user statuses on said mobile communication network, and corresponding identification of users, the user statuses on said mobile communication network comprising communication statuses of said mobile communication terminals; and sending means for detecting a change in user statuses stored in said status storing means, and sending the identification of the user and the new user status to said mobile communication terminals, regardless of whether the mobile communication terminals called ones of the mobile communication terminals having a change in user status, said mobile communication terminals having storing means for storing the user status and corresponding identification of the user that have been sent, and status outputting means for outputting the stored user status according to a configuration.

* * * * *